(12) United States Patent
Morgan et al.

(10) Patent No.: US 7,431,395 B2
(45) Date of Patent: Oct. 7, 2008

(54) BUNTING SYSTEM FOR CHILD STROLLERS AND THE LIKE

(75) Inventors: A. Mitra Morgan, Brookline, MA (US); Susan B. Forbes, Medfield, MA (US)

(73) Assignee: Brooks Pond, Inc., Brookline, MA (US)

( * ) Notice: Subject to any disclaimer, the term of this patent is extended or adjusted under 35 U.S.C. 154(b) by 0 days.

(21) Appl. No.: 11/079,966

(22) Filed: Mar. 14, 2005

(65) Prior Publication Data

US 2005/0200174 A1 Sep. 15, 2005

Related U.S. Application Data

(60) Provisional application No. 60/553,195, filed on Mar. 15, 2004.

(51) Int. Cl.
*A47C 31/00* (2006.01)

(52) U.S. Cl. .................................. 297/219.12

(58) Field of Classification Search ............. 297/250.1, 297/184.13, 184.14, 219.1, 219.12, 229, 297/184.11; 5/655, 94, 416; 2/69.5, 84
See application file for complete search history.

(56) References Cited

U.S. PATENT DOCUMENTS

| | | | |
|---|---|---|---|
| 4,241,458 A | 12/1980 | Lesesne | |
| 4,396,227 A | 8/1983 | Neilson | |
| 4,698,862 A | 10/1987 | Mairs | |
| D294,099 S | 2/1988 | Bromberg et al. | |
| 4,883,701 A | 11/1989 | Rankin et al. | |
| 4,885,200 A | 12/1989 | Perdelwitz, Jr. et al. | |
| 4,891,454 A | 1/1990 | Perdelwitz, Jr. et al. | |
| 4,946,221 A * | 8/1990 | Livingston | 297/184.13 |
| D312,549 S | 12/1990 | Perdelwitz, Jr. et al. | |
| D312,550 S | 12/1990 | Rankin, Jr. | |
| D313,525 S | 1/1991 | Perdelwitz, Jr. | |
| D313,526 S | 1/1991 | Rankin | |
| D313,527 S | 1/1991 | Perdelwitz, Jr. et al. | |
| D313,528 S | 1/1991 | Perdelwitz, Jr. | |
| D313,723 S | 1/1991 | Rankin et al. | |

(Continued)

OTHER PUBLICATIONS

"Toastie Toddler", www.mobilemoms.com/toastodblan1.html, (Mar. 11, 2005).

(Continued)

*Primary Examiner*—Milton Nelson, Jr.
(74) *Attorney, Agent, or Firm*—Strategic Patents, P.C.

(57) ABSTRACT

Bunting (100) having core bottom (110) extending over top of the child carrier seat (11/21) and shorter, core top (130) for enclosing child, along with like-sized, optional, decorative/functional cover (140), forming three, connectable, main layers (FIG. 6) or, alternatively, with the cover directly connected to core bottom, using compatible side fastener, zipper sets. The bunting bottom end is open allowing child's feet to extend down out from bunting bottom. Bunting-to-stroller, side attachments use special bunting/suspender clips (150; FIG. 14). Child's feet alternatively placed in integral boot pouch (120) attached to core bottom's bottom and flipped-over moveable between back and front sides (cf. FIGS. 1 & 2) and, alternatively, usable as storage pouch for rolled up, integral bunting (FIGS. 15 & 16). Core bottom's top can be cinched up forwardly to form hood or backwardly for attachment around stroller seat's top. Alternate embodiment in which optional cover (240) attachable only to core bottom (210; FIGS. 17 & 18).

19 Claims, 17 Drawing Sheets

U.S. PATENT DOCUMENTS

| | | | |
|---|---|---|---|
| 5,026,115 A | 6/1991 | Barnes | |
| 5,112,104 A | 5/1992 | De Giacomi | |
| D329,248 S | 9/1992 | Brown | |
| 5,333,769 A * | 8/1994 | Skroski | 224/158 |
| 5,437,061 A | 8/1995 | Kenner | |
| 5,466,505 A | 11/1995 | Fukuda et al. | |
| 5,522,639 A * | 6/1996 | Jaime | 297/184.13 |
| 5,652,960 A | 8/1997 | Kaknevicius | |
| 5,662,378 A | 9/1997 | Carruth | |
| D388,998 S | 1/1998 | Dubiel | |
| 5,711,169 A | 1/1998 | Leeke et al. | |
| 5,781,946 A | 7/1998 | McEntire et al. | |
| 5,941,599 A | 8/1999 | Roberts | |
| 5,956,766 A | 9/1999 | Benway | |
| 5,988,742 A | 11/1999 | Stevens | |
| 6,012,184 A | 1/2000 | Childers | |
| 6,012,189 A | 1/2000 | Dudley | |
| 6,055,686 A | 5/2000 | Knight | |
| 6,056,355 A | 5/2000 | Klassen | |
| 6,105,168 A | 8/2000 | Hazen | |
| 6,209,953 B1 | 4/2001 | Mackay et al. | |
| 6,224,152 B1 | 5/2001 | Hughes et al. | |
| 6,272,683 B1 | 8/2001 | Symms et al. | |
| D448,914 S | 10/2001 | Caudill | |
| 6,394,543 B1 | 5/2002 | Dunne et al. | |
| D462,182 S | 9/2002 | Brewer | |
| D462,221 S | 9/2002 | Brewer | |
| 6,481,791 B1 | 11/2002 | Facchini et al. | |
| 6,517,153 B1 | 2/2003 | Brewer | |
| D473,037 S | 4/2003 | Williams | |
| 6,547,325 B2 | 4/2003 | Drost et al. | |
| D477,744 S | 7/2003 | Kelly | |
| D479,938 S | 9/2003 | Quirk | |
| 6,669,225 B2 * | 12/2003 | Greger et al. | 280/648 |
| 6,749,258 B1 * | 6/2004 | Leikin | 297/219.12 |
| 2004/0217633 A1 * | 11/2004 | Kassai et al. | 297/219.12 |

OTHER PUBLICATIONS

"Baby Footmuff", www.babyfootmuff.com, (Mar. 9, 2005).
"BundleMe—JJCole Collections", http://jjcoleuse.com/InfoBM.html, (Jan. 10, 2005).
"The Buggysnuggle Company", www.buggysnuggle.com/acatalog/Online_Catalogue_Buggysnuggles_1.html, (Mar. 10, 2005).
"Nano Bag", www.nanobag.com/, (Mar. 8, 2005).
"Gaga Bag", http://nanobag.com/newproducts.htm, (Feb. 4, 2005).
"Cozy To Go", http://inventiveparent.com/cozytogo.htm, (Aug. 11, 2002).
"Buggy Bag Stroller Bag", www.buggybag.com/, (Mar. 3, 2005).

* cited by examiner

BUNTING SYSTEM FOR CHILD STROLLERS AND THE LIKE

REFERENCE TO RELATED PROVISIONAL APPLICATION

Applicants claim the benefit of provisional patent application Ser. No. 60/553,195 filed Mar. 15, 2004, likewise entitled "Bunting System for Child Strollers and the Like."

TECHNICAL FIELD

The present invention relates to a stroller for a baby or young child and more particular to a bunting addition thereto for cushioning and/or covering the young child or baby occupant of the stroller. The bunting addition of the invention in its preferred embodiment can also be used with car seats, baby carriers, or combinations thereof, etc. The preferred bunting system of the invention includes three, basic elements—(1) a core bottom which is attached to the seat of the child carrying device, (2) a core top which can be included, if desired, by being fastened to the core bottom along its side edges forming with the core bottom a bunting that surrounds the occupant, and (3) a decorative/functional cover which can be either attached along the side edges to the core top if it is included, or directly to the core bottom along its side edges if the core top is not included. Alternatively, the bunting can be designed so that the cover can only be directly attached to the core bottom. A boot pouch is integrally attached to the bottom of the core bottom which can be switched between a back-side, storage disposition when not in use and a front-side disposition when it is desired to have the occupant place his/her feet in the boot pouch. Other bunting features are included, as described below.

BACKGROUND ART

A list of prior patents which may be of some general interest, although it is noted that some of them are not from the field to which the present invention pertains, is provided below:

| Patent No. |
| --- |
| 6,547,325 |
| 6,517,153 |
| 6,481,791 |
| 6,394,543 |
| 6,272,683 |
| 6,224,152 |
| 6,209,953 |
| 6,105,168 |
| 6,056,355 |
| 6,055,686 |
| 6,012,189 |
| 6,012,184 |
| 5,988,742 |
| 5,956,766 |
| 5,941,599 |
| 5,781,946 |
| 5,711,169 |
| 5,662,378 |
| 5,652,960 |
| 5,466,505 |
| 5,437,061 |
| 5,112,104 |
| 5,026,115 |
| 4,891,454 |
| 4,885,200 |
| 4,883,701 |

| Patent No. |
| --- |
| 4,698,862 |
| 4,396,227 |
| 4,241,458 |
| D 479,938 |
| D 477,744 |
| D 473,037 |
| D 462,221 |
| D 462,182 |
| D 448,914 |
| D 388,998 |
| D 329,248 |
| D 313,723 |
| D 313,528 |
| D 313,527 |
| D 313,526 |
| D 313,525 |
| D 312,550 |
| D 312,549 |
| D 294,099 |

Products which presently exist on the market focus on infants. Some of the makers also sell toddler versions, but they are often too small to fit children older than about eighteen (18) months. This difference in sizing requires that a parent purchase additional bunting(s) after their child has outgrown the first bunting. The following are examples of infant and toddler versions of the same product:

"BUNDLE ME®" bunting from JJ Cole

"BABY FOOTMUFF"

The buntings, on the market and which may be prior art, usually require that a child's feet be enclosed within the bunting. While this is useful for an infant, it is problematic for older children who are often wearing shoes or boots or other "street" footwear and may wish to have greater freedom of movement. In addition, with older children their shoes are often dirty which means that the interior of the bunting is soiled each time they put their shoes in it.

Aesthetic features on buntings are primarily limited to color choice. Differences in materials, patterns and textures apparently do not readily exist in the USA market; some examples are known in at least the UK, but they apparently are not sold in the U.S. market.

The present invention is designed to provide a much better, more adaptable in use, blanket/bunting system for baby and child strollers and the like than that achieved in the prior art.

GENERAL DISCUSSION OF INVENTION

As previously noted, the present invention relates to a baby or young child stroller and the like (e.g., car seats, baby carriers, or combinations thereof, etc.) and more particularly to a bunting addition therefor.

To simplify the discussion of the preferred features of the currently preferred embodiment of the present invention, the following terminology will be used in connection with the exemplary, currently preferred embodiment of the bunting system of the present invention discussed below in the following sections.

Basic Elements or Sub-Elements' Terms & Descriptions:

Bunting;

Core—

—Core Bottom, and

—Core Top;

Cover (Decorative/Functional);
Boot Pouch;
Boot Guard; and
Bunting Suspender with Clip Bunting: flexible, soft material on which a baby or young child may sit while in a seat and preferably also in which the baby or young child is covered or wrapped between either a core bottom element and a core top element, or a core bottom element and a core top element with a cover, or a core bottom element and a cover.

Boot Area (FIG. 1): An area associated with the bottom portion of the bunting extending from about the occupant's knees to about the heels.

Core: the functional portion of the bunting typically comprising, for example, in the preferred embodiment, a soft material interior with, for example, a flexible, highly durable material on the exteriors.

Core Bottom (FIGS. 1/2, 6 & 7/8): that fitted portion which lays down against the stroller seat and on top of which the child (baby) sits or reclines.

Core Top (FIGS. 11/12): that portion which lays across the child's legs and torso, and which attaches to the core bottom typically by means of preferably side fasteners (e.g., mating zipper elements) which extend from about the heels up to about the shoulders on either side. The core bottom and the core top, when fastened together, make up the total core of the bunting. Preferably the fasteners that are used to connect the two core elements together are located on the sides of the core elements (preferably mating zipper elements or other appropriate fasteners), allowing, if so desired, the very bottom portions of the two core elements to be unfastened, leaving the bottom of the core open, allowing the occupant's feet to extend down past the core elements, when such is so desired.

Cover (FIGS. 4 & 13): a decorative and/or functional cover that typically fastens, preferably by zippers or other appropriate fasteners, directly onto the core top, but also preferably may also be fastened, preferably by like zipper parts or other appropriate fasteners, directly to the core bottom without the core top being present.

Boot Pouch (FIGS. 1 & 9), which preferably is made of a flexible, water repellant material, preferably is integrally attached to the lower area of the bunting's core bottom. It is preferably affixed along the bottom area of the core bottom and preferably adjacent to the lower portions of the exterior, peripheral fasteners (e.g. the zipper elements) which preferably run along the right and left sides of each of the bunting elements. Preferably an elastic member runs across the top edge periphery of the opening into the pouch, which allows it to be easily opened for inserting the occupant's feet or to insert and neatly store the rolled-up balance or main body of at least the core bottom element, if not the complete bunting. When used for the occupant's feet, the boot pouch is, for example, moved from its position on the back-side of the core bottom of the bunting to bring it to the front of the core bottom in a flipping like motion. In this open disposition, the elastic portion of the boot pouch runs horizontally across the front of the bunting occupant's lower legs. Preferably snaps on the boot pouch may be used to secure it to mating snaps on the back-side of the core top or, alternatively, "VELCRO®" type hook and loop type material or other suitable fasteners. In this way, a child's body would be fully enclosed in the bunting serving as protection even if the bottoms of the core bottom and core top are unfastened. When not being used for the occupant, the boot pouch preferably is moved back into place against the back-side of the core bottom, behind the bunting user's calves, and preferably snapped in place onto the back-side or other appropriate fasteners.

Most preferably the boot pouch is formed with a continuous, integral form of attachment (e.g., sewn) along its side edges and bottom edge which allows it to be merely flipped back and forth for alternative use for holding the child's (e.g., booted) feet or for out-of-the-way storage. However, it is possible to use solely snap fasteners for snapping it either to the front or the back side, as may be desirable or other appropriate fasteners, such as hook and loop material, zippers, etc.

The bottom portion of the front side of the core bottom, an area against which an older child's feet would rest, preferably is covered in a heavy-weight, water repellant material that resists the wear and tear of, for example, soiled shoes and boots. This heavy-weight or heavy-duty Boot Guard material (bottom portion of FIG. 7) preferably extends from about the occupant's heel area to just about below the back of the occupant's knee.

Bunting Clip or Strap/Suspender (FIG. 14) preferably includes a strap which has one end secured to the stroller by, for example, a loop-back of the strap going through, for example, a terminal "D" type ring at one end, with the loop going around the tubular side structure of the stroller, and the other end of the strap extended to the bunting (or blanket) using, for example, a "suspender" like clip attached to a selected one of a series of side belt-loops (FIG. 9) on the core bottom element. (Alternatively, "VELCRO®" type hook and loop type material or other suitable fasteners could be used in place of the suspenders.) This allows the bunting to be completely stabilized from side-to-side and fastened across the complete width of the stroller seat to the adjacent structural members of the stroller and also prevents the bunting from moving up and down within or off the stroller seat.

The clip can also be used to secure the bunting, when its main body is rolled up (FIG. 15) into the integral boot pouch for storage, to be hung from, for example, the stroller's rear handle bar (FIG. 16).

To assist the bunting clips to securely interconnect to each of their side walls and their adjacent tubular support structures of the stroller, running vertically along the edge of the core bottom adjacent to the fastening zippers, there preferably are, for example, a series of belt-loop-like fittings, which allow the user to easily secure the core bottom to the stroller using the bunting clips. Use of these loops with the bunting suspenders with clips ensures that the bunting does not slide down to where it can be soiled and/or interfere with the stroller's wheel movement.

The back-side portion of the core bottom (FIG. 8) which lays against the stroller seat, particularly in the central areas where it lays against the back and seat portions of the seat, is at least partially covered over with a slip-resistant, high friction, durable material to help prevent the bunting from sliding down when a child is placed in or removed from the stroller.

The bunting is designed to accommodate the placement of safety harnesses from a variety of strollers, infant carriers, etc. These slits ensure that the bunting may accommodate devices for infants and toddlers. Slits are made in the shoulder, waist and crotch areas to allow safety harnesses to pass through them and allow a child to be secured in the stroller using the stroller-provided harnesses while using the bunting of the present invention. For example, two, long, longitudinally extended slits run vertically along and through the back of the bunting's core bottom. These slits preferably may be opened or closed using, for example, snaps on the back-side of the core bottom which run along side them or, alternatively, using "VELCRO®" type material or other appropriate fasteners.

The bunting of the invention preferably is initially attached to the stroller by folding the top portion of the core bottom over the top, upper edge of the seat of the stroller or carrier/car seat or the like and cinching it by means of a cord which runs along the top, peripheral, edge portion of the core bottom element from about the occupant's shoulder area to about the other shoulder area (FIG. 7). The cord preferably is then secured by use of a cord toggle, and the excess cord is held against the back-side of the core bottom by use of an appropriate fastening. For example, a strap with either the hook part or the loop part of the "Velcro®" type fasteners on it, which is sewn to the back of the core bottom adjacent to where the exit for the cord and the toggle are located, with the strap mating with the other type of hook and loop fastenings on the core bottom itself (FIG. 10). Thereafter, when so desired, the top of the core bottom preferably may also be detached from the seat top and folded forward to form a hood for the occupant and cinched, similar to the way a hood is formed about the user's head on winter coats and the like.

The bunting preferably is designed to allow easy access to the zippers regardless of what device the bunting has been placed in. It preferably is contoured to assume a seated position (FIGS. 1, 2 & 4), but allows the occupant to recline fully as well (FIG. 3).

The bunting may be adapted to different uses by using interchangeable covers which are each individually secured to the core top when desired, or alternatively directly to the core bottom. These covers allow the user to change the look of the bunting as well as add additional or alternative functionality (warmth, rain-proofing, etc.). A selected cover is secured to the core top by appropriate fasteners, for example & preferably, mating zipper elements which also run along each side of the core top and the cover (FIG. 12). When a cover is not being used, these secondary zippers (or other appropriate fasteners) preferably are hidden from view by flaps that run alongside them on the core top and the cover. All of the zippers (or other fasteners) preferably are interchangeable and compatible for zipper element inter-mating, which means that in addition to being zippered onto the core top, a cover may also be secured directly to the core bottom, which then does not require the use of a core top (note alternative dashed arrows in FIG. 6).

The core top preferably also has a series of appropriate fasteners (e.g., buttons) which run along the top. These buttons preferably are used in addition to the side fasteners (e.g., zippers) to secure the top edge portion of the selected cover to the top edge portion of the core top. (See FIGS. 6 & 11.)

When the bunting is not being used, it's main body preferably can be rolled up into the interior of the integral boot pouch and be completely contained therein for easy storage (FIG. 15). By, for example, affixing a pair of bunting clips to the opposed ends of the encompassing, exterior material of the boot pouch using the "suspender"-type clips and having looped the strap material about the stroller's rear handle using the terminal "D" ring, the rolled-up and covered-over bunting may be hung from, for example, the rear handle of the stroller (FIG. 16).

The above summary description of various features of the system of the invention are each in most part independent of the other features, so that the invention with its various approaches does not need to include all of those feature to be patentable, and it should be understood that the claims to be presented legally define what is the invention. However, the future embodiments of the bunting system of the present invention, for covering a child, baby or other occupant in a stroller, child car seat, child carrier or a combination thereof, typically will have at least one or more of the following features or variants or combinations thereof— bunting attachable to a stroller or like seat for a young child/baby having at least two separable/attachable elements, each defining a longitudinally extended area, one longer than the other if only two layers are used, with one of the elements forming a longer, preferably contoured, bottom core attachable to the seat and extendable over the full length and width of the seat and a second element (core top and/or a cover) defining an extended rectangle shape but shorter in length than the core bottom and easily attachable & detachable thereto along their opposed, side edges, optionally with a third (cover) element defining substantially the same, shorter rectangle alternatively easily attachable & detachable to either the core bottom element or the second element (e.g., a core top element) by having side, matable fasteners compatible with those on the sides of the core bottom element and the second element;

a two or more (typically three) layer bunting with an open or at least openable bottom between the two, bottom-most layers so that the occupant's feet can be extended down through or positioned past the bottom end of the bunting at least optionally using, for example, a fastenable (e.g., snaps, buttons, zippered, etc.) bottom which easily can be opened or closed, as desired;

a boot pouch attached to the bottom of the core bottom element closed about its sides and bottom but with an open (preferably elasticized) or openable top that can be used to accept within it the occupant's shoed feet extending down out from the bunting or, alternatively & preferably, be used to store the rolled up main body of the bunting, with the boot pouch being moveable alternatively from the back-side and front-side of the core bottom;

two-way, parallel vertically/longitudinally aligned, fastening (e.g., zipper) elements on the sides of the core elements and cover(s) allowing, for example, the top of the core top and/or the cover to be folded over onto the child's lap by unfastening (unzipping) the upper portions of the side fastening elements and/or for the occupant's feet to remain unbound, freely extending out of the bottom of the bunting by having no fastenings used at the bottom edge portions of the core bottom element;

when the bunting is not being used, it's main body preferably can be rolled up into the integral boot pouch for easy storage. By affixing the bunting clips to the lowest one of the belt-loop-like fittings, the rolled-up and covered-over bunting may be hung from, for example, the handles of the stroller;

any excess of a cinch cord, located past a cord toggle, located in the top portion of the core bottom is held against the back-side of the core bottom by use of, for example, a strap with hook and loop fasteners which is sewn to the back-side of the core bottom adjacent to where the exit for the cord and toggle are located; and/or one or more of the other innovative features disclosed or described in this specification and claimed herein, etc.

Currently the initially preferred embodiment of the invention includes all of the foregoing features but other embodiments of the invention can include fewer features and still incorporate patentable features of the invention as defined by the claims below read in light of this specification, noting that the most recent, currently preferred embodiment (FIGS. 17 & 18) does include a more limited but more easily manufactured embodiment as a further alternative embodiment in which the cover can only be directly attached to the core bottom element and not to the top core element.

Thus, it should be understood from the foregoing, the further discussions in the following sections and the accompanying drawings that the present invention includes in its most preferred embodiments and approaches, with various alternatives, a child bunting system for a manually manipulated child carrier having a child carrying portion, such as, for example, a child stroller and the like, comprising:

a bottom core element of flexible material having a top area and a bottom area and placeable in or on the carrier with the child placed on top of the bottom core element, with the bottom core element being at least about coextensive in size with the child carrying portion of the child carrier;

a separable, top core element of flexible material attachable to and easily removable from the bottom core element by easily fastenable and un-fastenable fastening devices, the top core element having a top portion locatable below the top area of the bottom core element, and a bottom portion locatable in overlying juxtaposition to the bottom area of the bottom core element when the two elements are fastened together, the child being located between the bottom core element and the top core element with the child's head resting on the bottom area and with the bottom area and the bottom portion of the elements being at least openable with respect to one another when attached together, allowing the child's feet to extend down out past at least the bottom portion of the top core element; and a separate cover of flexible material which is attachable by easily fastenable and un-fastenable fastening devices to at least one of the core elements and being at least about coextensive in size with the top core element.

Additionally, the bottom core element has a bottom terminal end, and the bottom core element preferably includes a boot pouch in its bottom area at the bottom terminal end into which the child's feet are placeable while the child is positioned on the bottom core element. At least the bottom core element and preferably any attached top core element and/or cover can be rolled up and inserted into the interior of the boot pouch for storage between uses of the bottom core element. The boot pouch is flippable back and forth between being located on the underside when not in use and on the top side to be useable by the child.

Also, the bottom core element has a top side and an underside which interfaces with the child carrier portion of the child carrier.

The child carrying portion has a top and, in an exemplary application, the child carrier is a stroller made in part of tubular members located in part above the top of the child carrying portion forming a pushing handle, and the series of at least two elongated, suspender-type fastening straps having two ends, each having a clip at least one end, the suspender-type straps are used to connect the rolled up and stored boot pouch to the tubular members, suspending the boot pouch in its storage disposition from the stroller handle.

The exemplary stroller is made in part of tubular members located in part along the sides of the child carrying portion, while the bottom core element has sides made of flexible material. In this situation the series of at least two elongated, suspender-type fastening straps having two ends, each having a clip at least one end, are used to connect the sides of the bottom core elements to the tubular members.

Also, in one approach the top core element has two, independent sets of fastening devices, one set being compatible with mating fastening devices on the bottom core element and the other being compatible with mating fastening devices on the cover, while the cover's fastening devices are also compatible with the fastening devices on the bottom core element, allowing the cover to be attached when desired to either the top core element which is attached to the bottom core element or, alternatively, directly to the bottom core element.

In another approach the top core element has only one set of fastening devices, the set being compatible with mating fastening devices on the bottom core element; while the cover has a like set of fastening devices as the top core element, allowing the cover to be attached when desired to the bottom core element or, alternatively, the top core element to be attached to the bottom core element.

The bottom core element has a curved, upper peripheral edge, while the top area of the bottom core element includes a cinch member along the curved, upper peripheral edge, allowing the top area to be cinched up around the head of the child, forming a hood for the child.

The bottom core element and the top core element each has two, opposed sides, the sets of fastening devices on the bottom core element and on the top core elements, respectively, being mating zippers located and extending along the respective sides of the core elements, with the zippers on the sides of the top core element extending up into the top portion, while the zippers on the sides of the bottom core element extending short of the top area, preferably with neither zippers extending laterally across either the bottom area or the bottom portion, leaving the lowest extent of the bottom portion and the bottom area unconnected and open, allowing the child's feet to extend down out past the bottom portion and the bottom area.

The bottom core element and the top core element each has two, opposed sides, the sets of fastening devices on the bottom core element and on the top core elements, respectively, being mating zippers located and extending along the respective sides of the elements, with the zippers on the sides of the top core element extending up into the top portion, while the zippers on the sides of the bottom core element extending short of the top area, with the cover likewise having opposed sides and zippers located and extending along its sides for mating with at least one of the core elements.

In a different approach the top core element has only one set of fastening devices, the set being compatible with mating fastening devices on the bottom core element; while the cover has a like set of fastening devices as the top core element, allowing the cover to be attached when desired to the bottom core element or, alternatively, the top core element to be attached to the bottom core element.

Of course, there are various other system and methodology aspects to the present invention related to the foregoing, preferred structural arrangements, as brought out in the accompanying claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers, and wherein:

FIG. 7 is a frontal, plan view of the outer or top side of the core bottom element with the bottom, integral boot pouch folded back onto the back side and therefore unseen in the figure, which back-side disposition occurs in FIG. 2 and therefore is unseen there as well; while

EXEMPLARY MODES FOR CARRYING OUT THE INVENTION

Summary of Reference Numbers (FIGS. 1-16)

Figure 1:
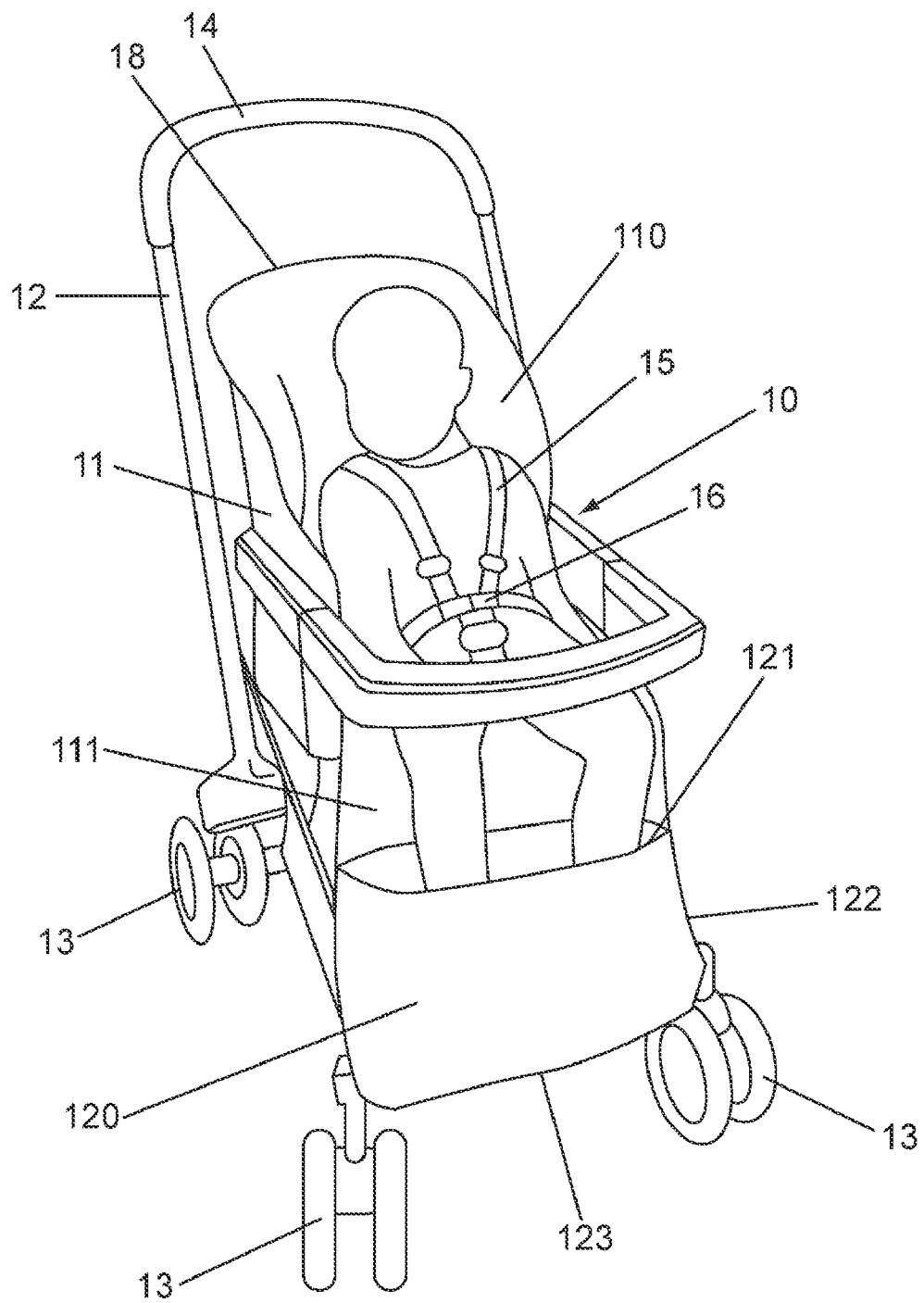
FIG. 1 is a front, perspective view of an exemplary, "prior art" stroller with an occupant in it sitting on top of the core bottom element, that forms a part of the currently preferred, exemplary embodiment of the bunting system for child strollers and the like of the present invention, positioned on and fastened to the stroller's seat, with the occupant child's feet inserted into the integral boot pouch at the bottom area of the core bottom.

| Item | Reference No. |
|---|---|
| Stroller | 10 |
| supporting seat | 11 |
| tubular, structural members | 12 |
| wheels | 13 |
| rear handle bar | 14 |
| seat harness | 15 |
| connectable straps | 16 |
| seat top | 18 |
| Combined Carrier/Car Seat | 20 |
| seat | 21 |
| carrier handle | 22 |

-continued

Summary of Reference Numbers (FIGS. 1-16)

| Item | Reference No. |
|---|---|
| handle pivot axis | 23 |
| seat harness | 25 |
| connectable straps | 26 |
| seat top | 28 |
| Bunting | 100 |
| Core Bottom | 110 |
| front side | 111 |
| back side | 112 |
| bottom area | 113 |
| boot guard material | 113A |
| central area | 114 |
| non-skid material | 114A |
| harness strap slits | 115 |
| front-side material layer | 116 |
| back-side material layer | 117 |
| basic body | 118 |
| top area | 119 |
| top cinch subsystem | 119A |
| cinching cord | 119B |
| cinching toggle | 119C |
| attached strap with one part of hook/loop material | 119D |
| other part of hook/loop material | 119E |
| Boot Pouch | 120 |
| elasticized top (entry) | 121 |
| closed side walls | 122 |
| closed bottom | 123 |
| Core Top | 130 |
| front side | 131 |
| back side | 132 |
| bottom area | 133 |
| top fastening buttons | 135 |
| top-side material layer | 136 |
| under-side material layer | 137 |
| snaps | 138 |
| top area | 139 |
| Decorative/Functional Cover | 140 |
| front side | 141 |
| back side | 142 |
| bottom area | 143 |
| top fastening button holes | 145 |
| top-side material layer | 146 |
| under-side material layer | 147 |
| peripheral fringe | 148 |
| top area | 149 |
| Bunting Straps/Clips (Suspenders) | 150 |
| strap body | 151 |
| D-ring | 152 |
| "suspender"-type clip | 153 |
| length adjustment buckle | 154 |
| strap loops (on core bottom) | 155 |
| lowest ones of the belt straps | 155A |
| Side Zipper Elements | 160 |
| main zipper run with box/stop ends | 161 |
| double, zipper, slider pull tabs | 162 |
| main complimentary zipper run [with zipper pin/stop ends] | 163 |
| supplemental zipper run w. box/stop ends | 164 |
| supplemental, complimentary zipper run [with zipper pin/stop ends] | 165 |
| Alternative, Core Top (FIG. 17) | 230 |
| complimentary zipper run [with zipper pin/stop ends] | 263 |
| Alternative, Decorative/Functional Cover (FIG. 18) | 240 |
| complimentary zipper run [with zipper pin/stop ends] | 265 |

"Prior Art" Stroller (FIGS. 1-4 & 16)

As can be seen in FIGS. 1-4 & 16, an exemplary "prior art" stroller 10 for young children, including babies, comprises a supporting seat 11 for the occupant suspended from and supported by a series of typically tubular, structural members 12 located up along the four points where the wheels 13 are located and passing alongside the seat, along with various other structures, the combination of most of which allow the stroller to be folded into a smaller storage disposition and back up into a stable, operative disposition as illustrated. A rear, laterally extending handle bar 14 is provided for pushing or pulling the stroller and for guiding it typically by an adult.

Typically, a seat harness 15, made up of a series of connectable straps 16 effectively affixed at their distal ends to the seat structure, is provided on the stroller to securely hold the young child (baby) in the seat 11.

As can be seen in FIGS. 1-4, the bunting 100 of the exemplary embodiment of the present invention can be placed in and used in connection with the stroller seat 11 and other parts of the stroller, as detailed more fully below and above.

Figure 5:
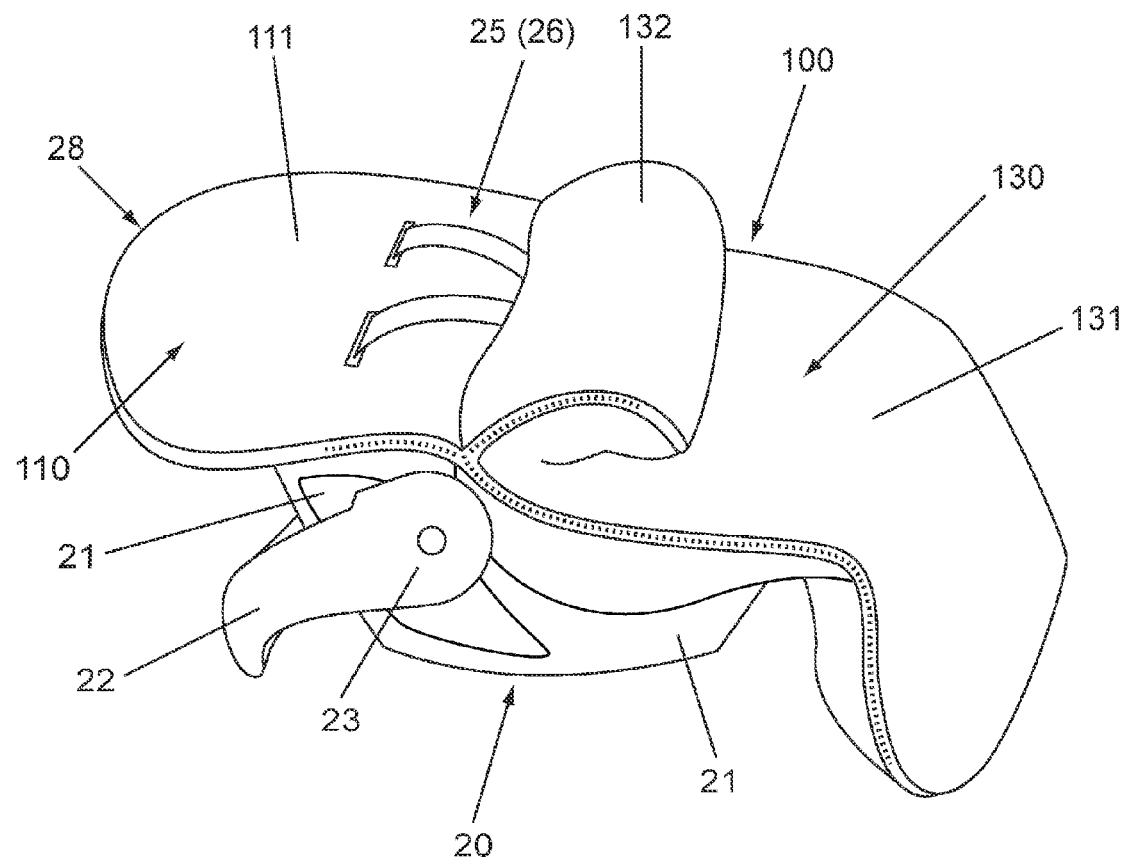
FIG. 5 is a side perspective view of the core bottom and top elements connected together with the resulting bunting being used on an exemplary, "prior art" infant carrier.

"Prior Art" Baby Carrier (FIG. 5)

As can be seen in FIG. 5, an exemplary, "prior art" baby carrier 20 includes a seat 21, often similar in configuration to the seat of the stroller 10 and the seat of a young child/baby's car seat. Typically, in similar fashion to the stroller 10, a harness 25 made up of a series of connectable straps 26, effectively affixed at their distal ends (unseen in drawings but standard) to the seat structure, is provided on the carrier to securely hold and restrain the young child (baby) in the seat 21.

As can be seen in FIG. 5, the bunting 100 can be placed in and used in connection with the carrier seat 21.

Initial, Exemplary Bunting Embodiment (FIGS. 1-16)

Figure 6:
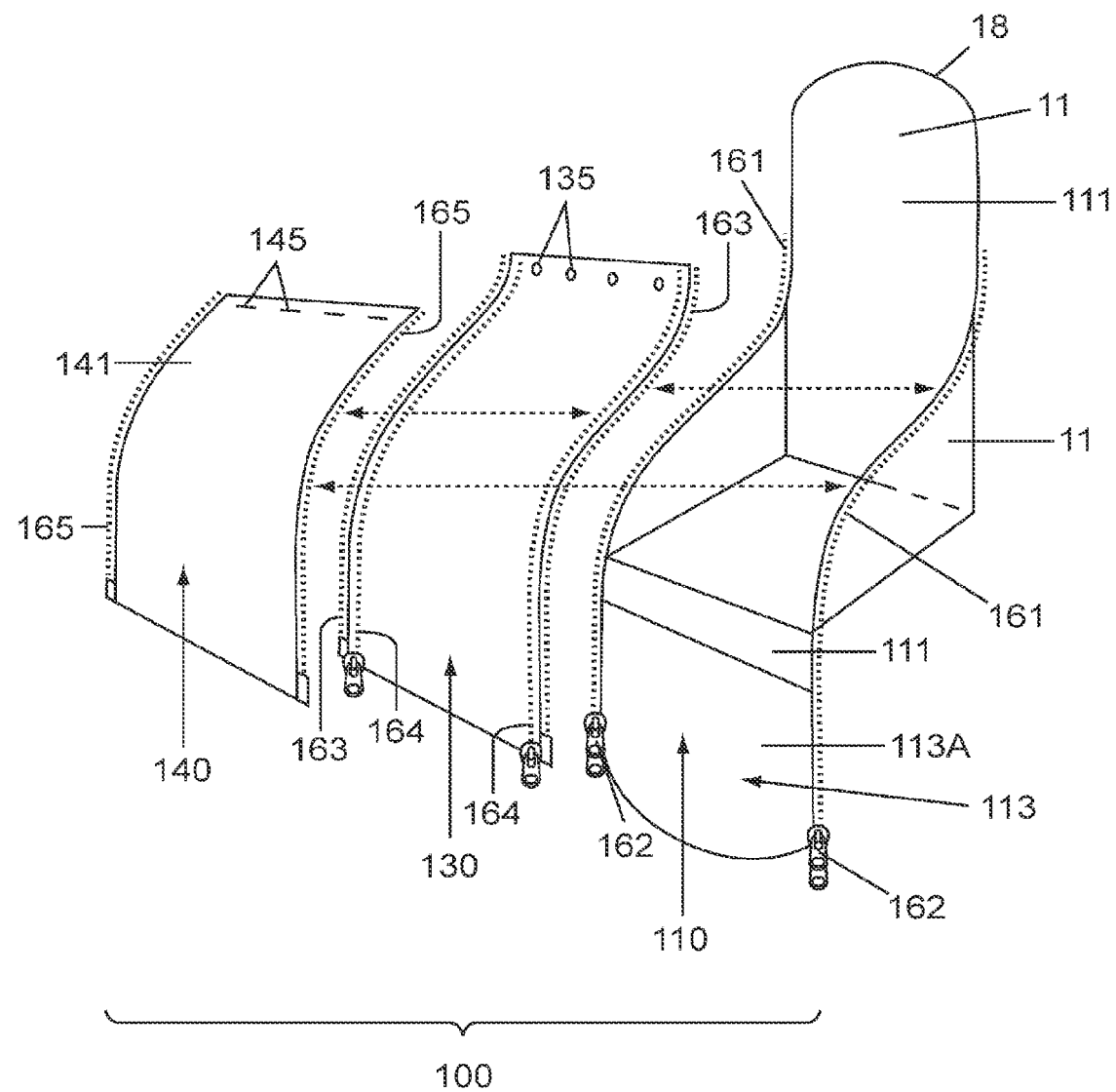
FIG. 6 is an exploded, perspective, generalized, frontal view of the complete, three-element bunting system of the currently preferred embodiment, showing the core bottom (on stroller/carrier seat), core top and the decorative/functional cover elements, with dashed lines & arrows showing how the core top element can be directly attached to the core bottom, and how the decorative/functional cover element can be directly attached to either the core bottom element or the core top element using some of the same peripheral, double-ended, zipper, mating structures on the core bottom and on the core top.
Figure 7:
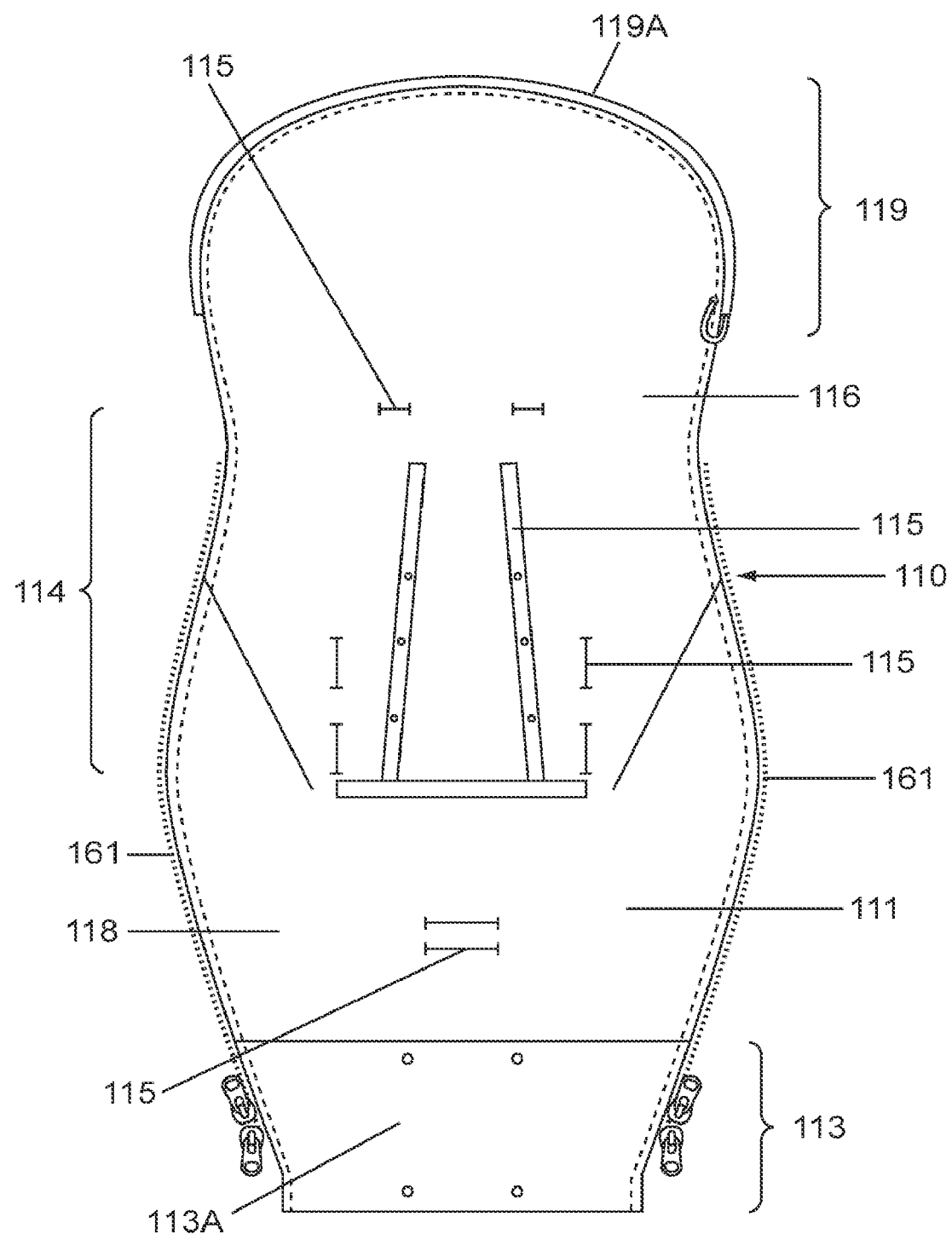
Figure 8:
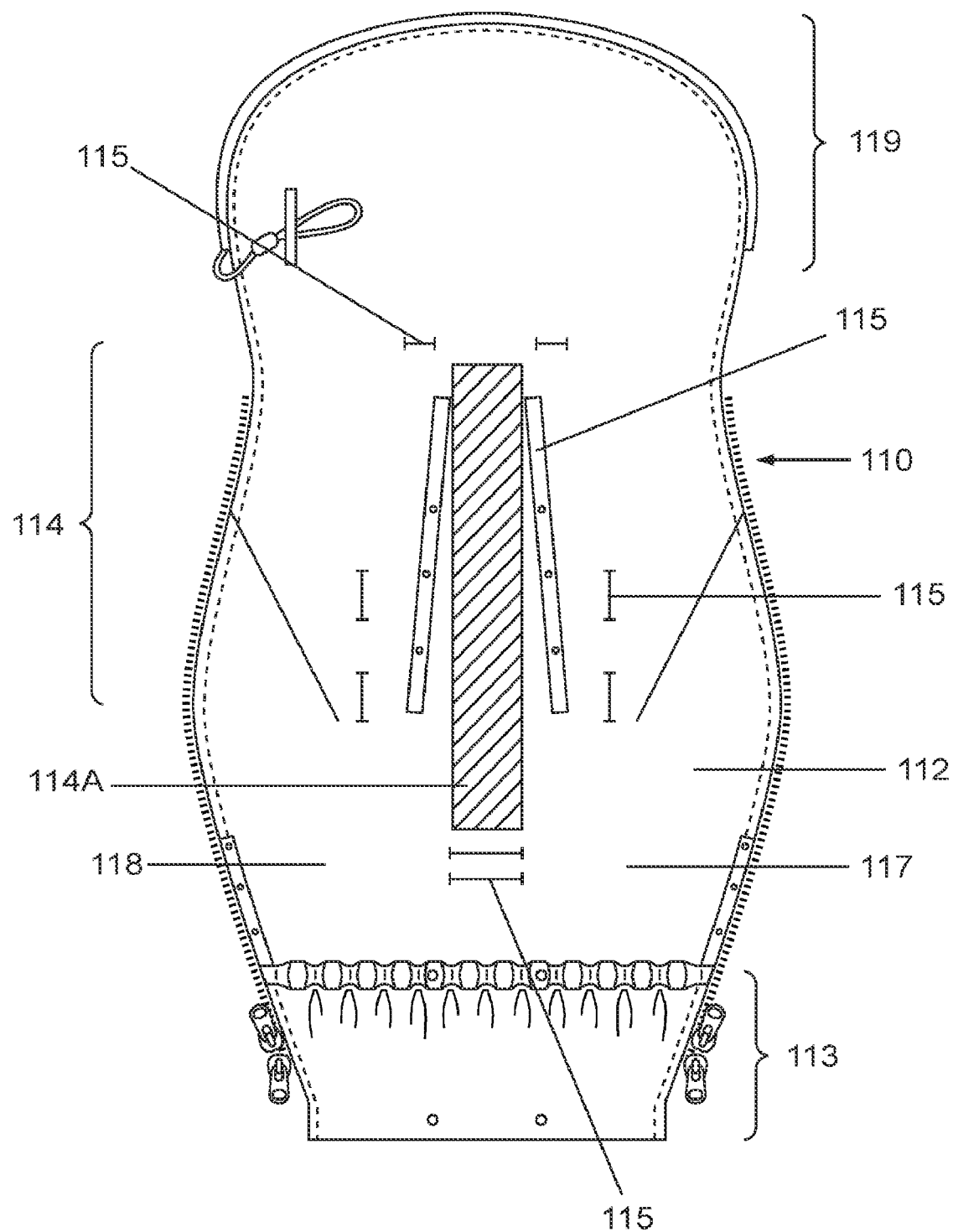
FIG. 8 is a is a bottom or underside view of the core bottom element with the bottom, integral boot pouch folded up onto the front side and hence unseen on the underside of this figure, which front-side disposition is seen in the frontal view in FIG. 1 and hence seen there.
Figure 9:
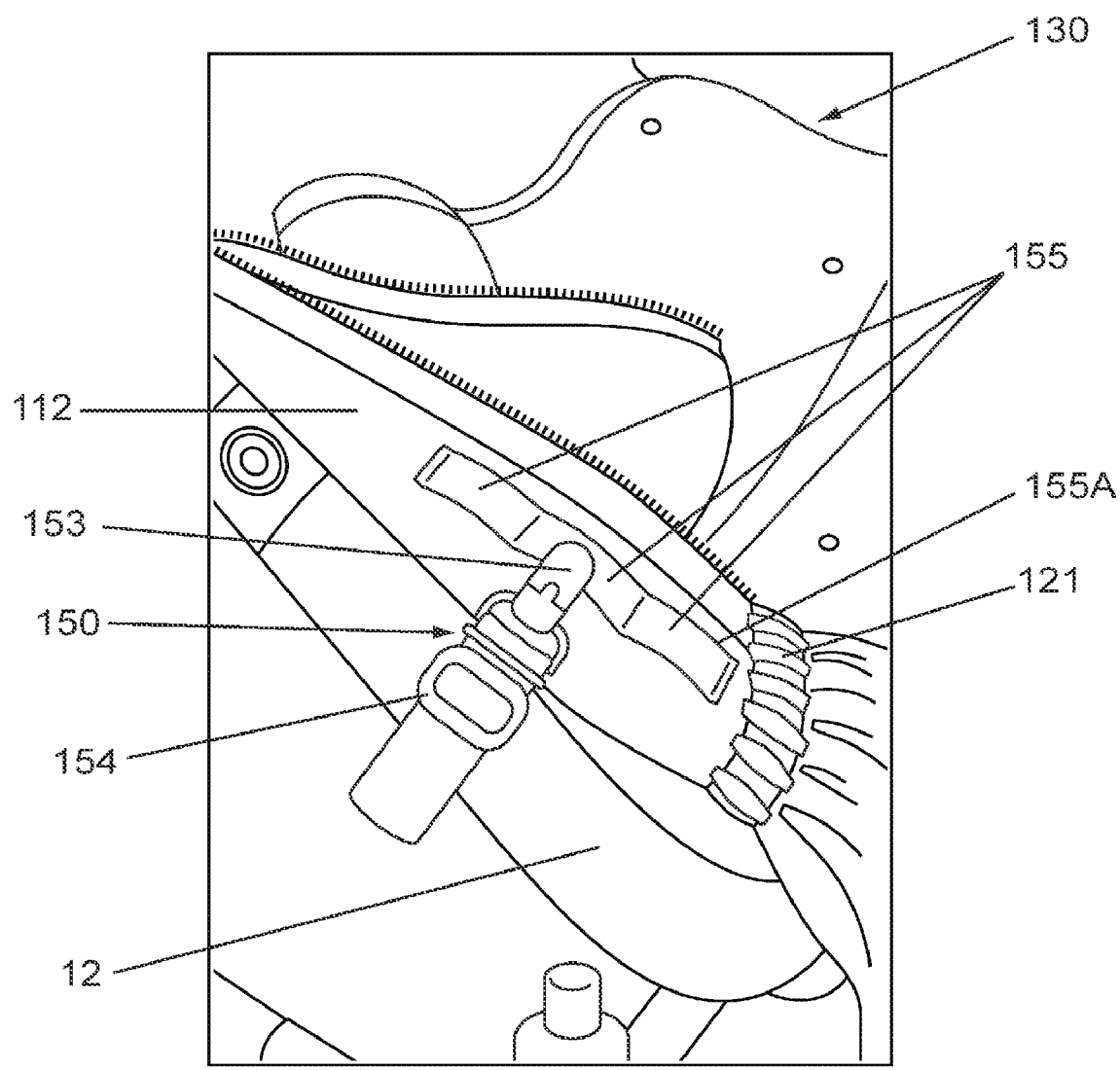
FIG. 9 is a frontal, close-up, detail view of the right side (from the occupant's perspective) of the core bottom element, with the other, left side being a mirror image thereof, showing—
- a series of connecting loops which can be individually and selectively used with, for example, one or more of the bunting clips or strap(s) shown in FIGS. 14 & 16, to connect the side edges of the bottom core element to, for example, the tubular structural members along the sides of the stroller structure, adding to the strength and reliable positioning and attachment of the core bottom to the stroller seat, and
- a portion of the side zipper run for directly connecting the core bottom element to either the core top element or directly to the cover element, along with a portion of the top of the integral boot and its resilient, elastic band top.
Figure 10:
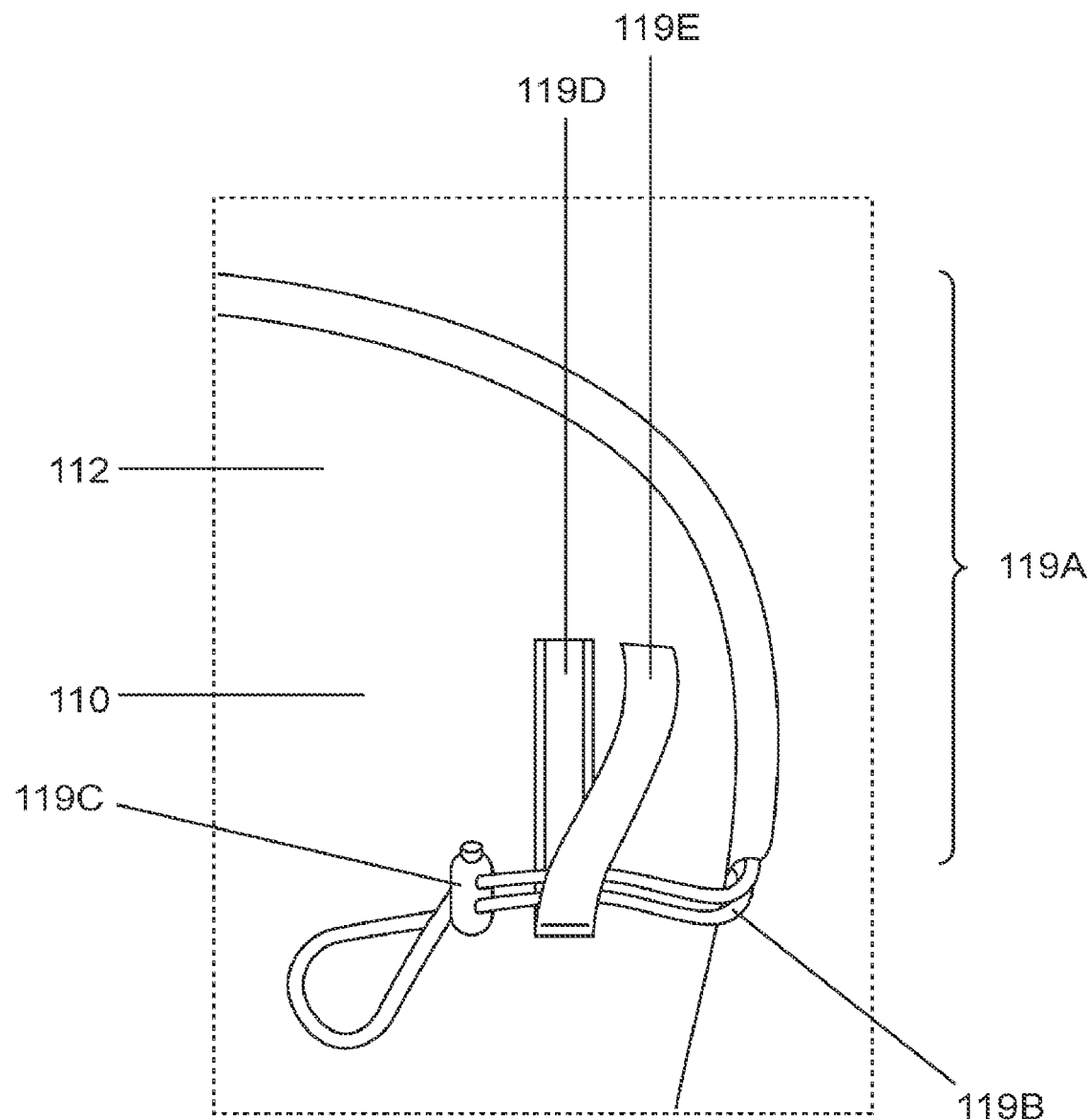
FIG. 10 is a rear, close-up, detail view of the underside of the upper, left (from the occupant's perspective) corner, of the bottom core element and its strap holder (using, for example, hook and loop fastenings, e.g., "Velcro®") for holding the excess hood cord used to cinch up the top edges of the core bottom.

As can be seen in FIGS. 1/2, along with FIGS. 6 & 7/8, 11 & 13, the exemplary, currently preferred embodiment of the over-all bunting 100 of the present invention comprises at least two, basic, joinable, core elements or parts, for example, a core bottom 110 and a core top 130, forming together in fastened combination the complete core (110/130) of the bunting 100 for comfortably supporting and protectively covering a young child (baby) in, for example, a stroller 10 (FIGS. 1+), a child/baby car seat, a baby carrier, a combined baby car seat & carrier 20 (FIG. 5), and the like, the seats of all of which are comparable in size, adjusted for the size of the child it is designed for, and configuration with respect to the portions of the seat surfaces that contact the occupant.

Figure 13:
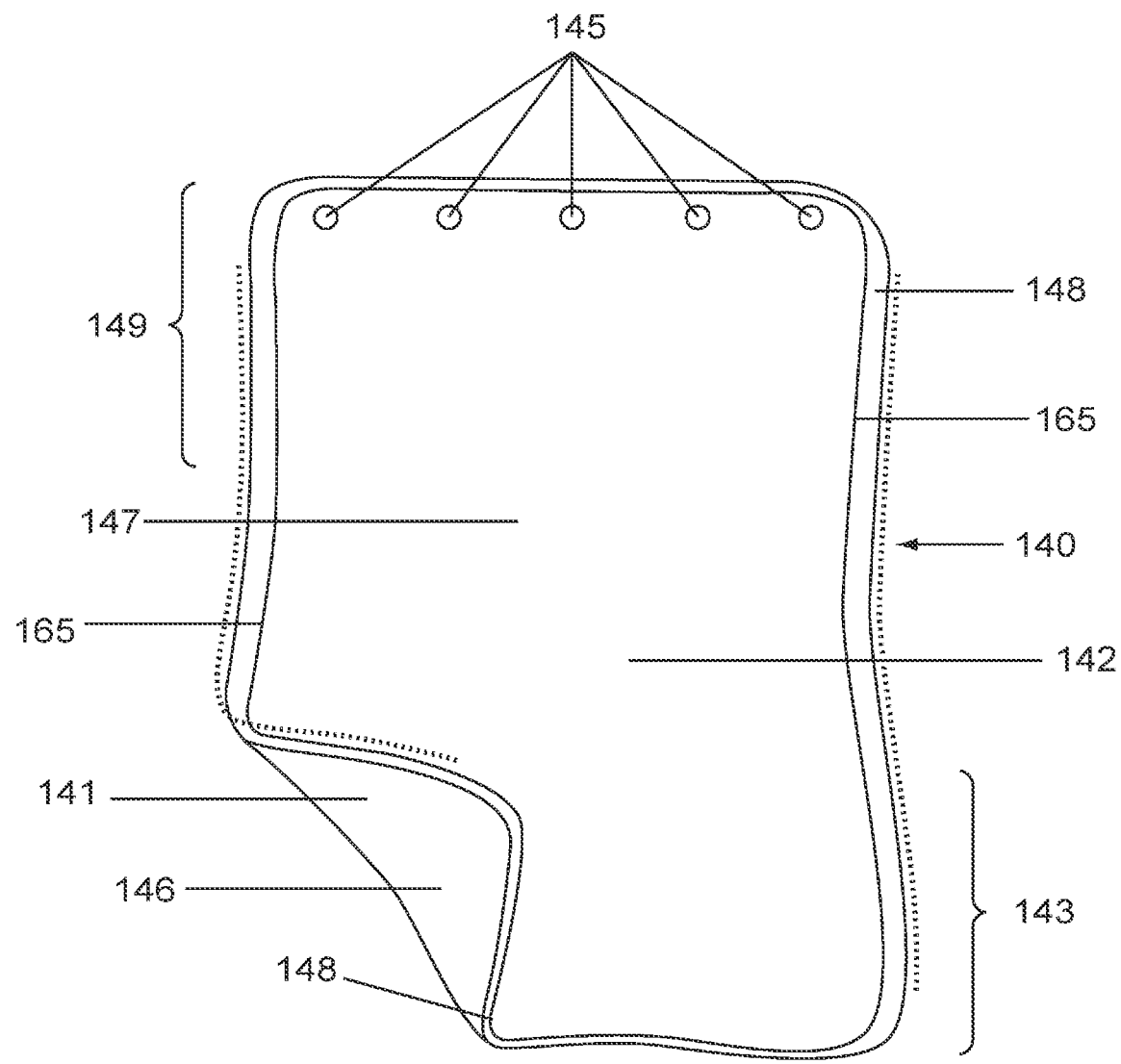
FIG. 13 is a plan view primarily of the underside of the decorative/functional cover element, with a corner turned up to expose the upper, decorative side, the top or upperside of which also is shown in FIG. 4.
Figure 14:
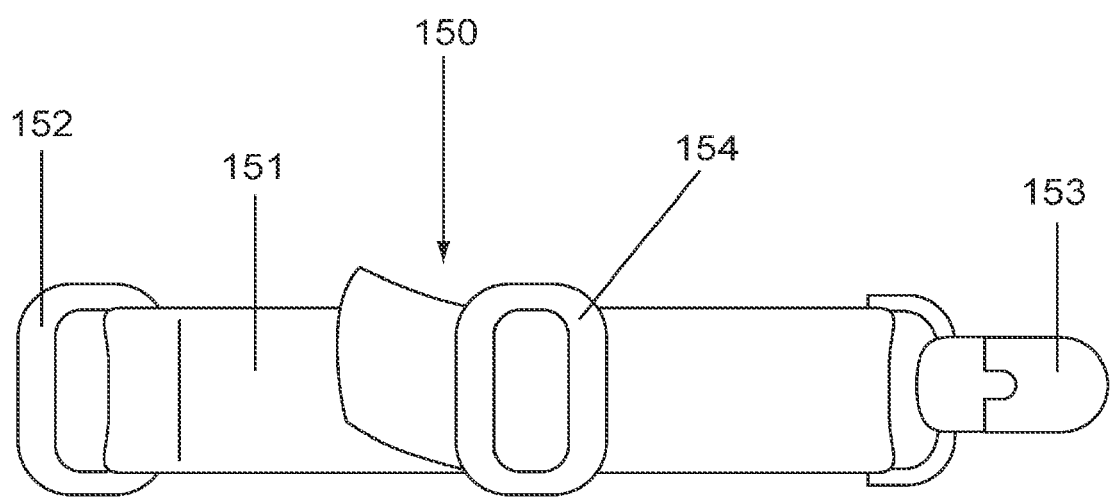
FIG. 14 is a plan view of a supplemental, "suspender"-type, bunting strap which can be used in connection with the belt loops shown in FIG. 9 to attach the sides of the core bottom to, for example, the tubular side structural members of the stroller or to, for further example, attach the rolled up bunting to the back handle bar of the stroller as shown in FIG. 16.

As can best be seen in FIGS. 6 & 13, a third bunting element, in particular, an optional, changeable, decorative and/or functional cover 140, for example, of substantially the same size and configuration (substantially rectangular as defined, for example, by their respective four corners) as the core top 130, both of which are substantially shorter in length (from top to bottom) than the core bottom 110, but all are the substantially same side or lateral width at least in some areas.

Figure 2:
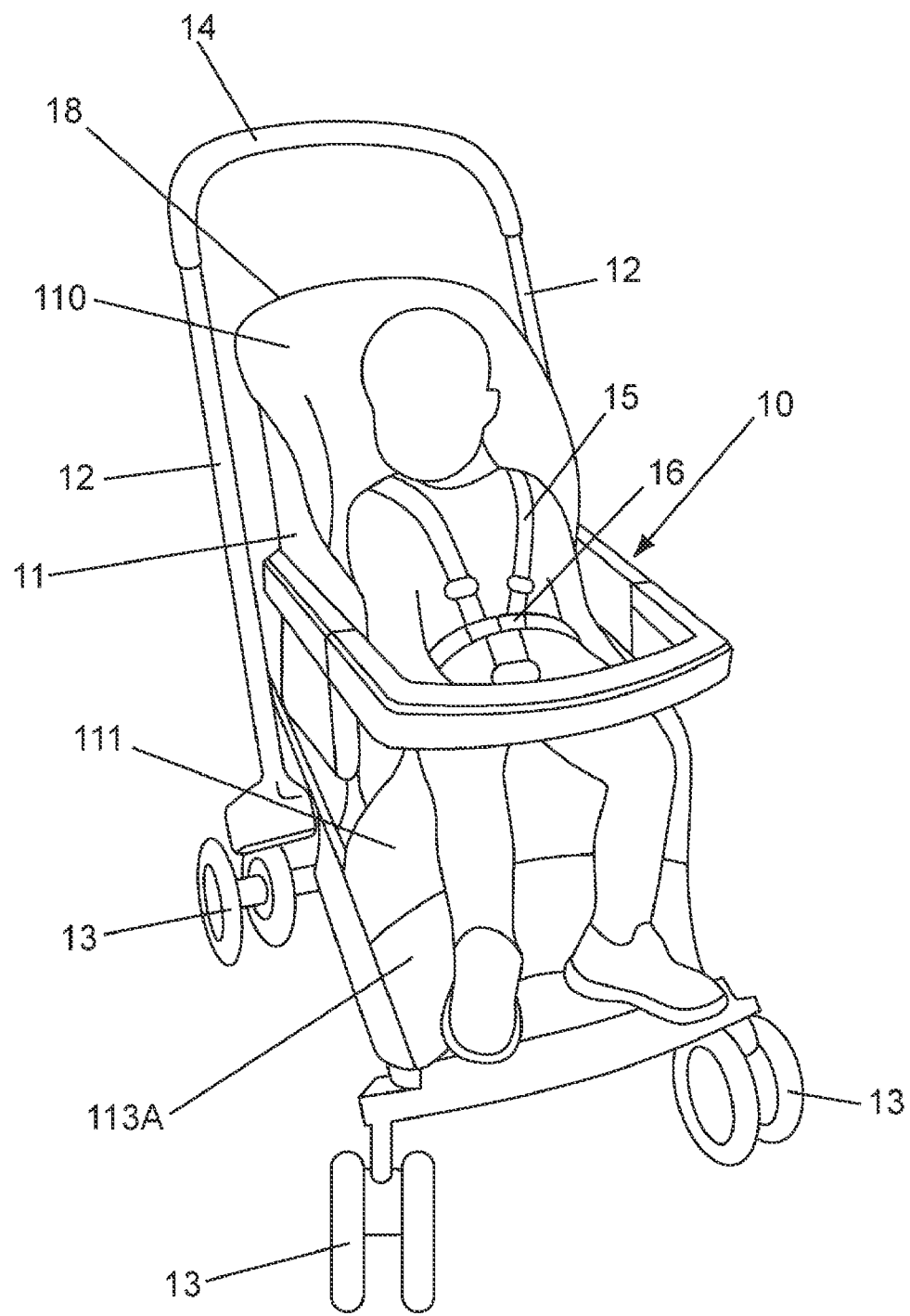
FIG. 2 is a front perspective view, similar to that of FIG. 1, but with the integral boot on the core bottom folded back to the underside of the core bottom as an alternate arrangement to that shown in FIG. 1.
Figure 3:
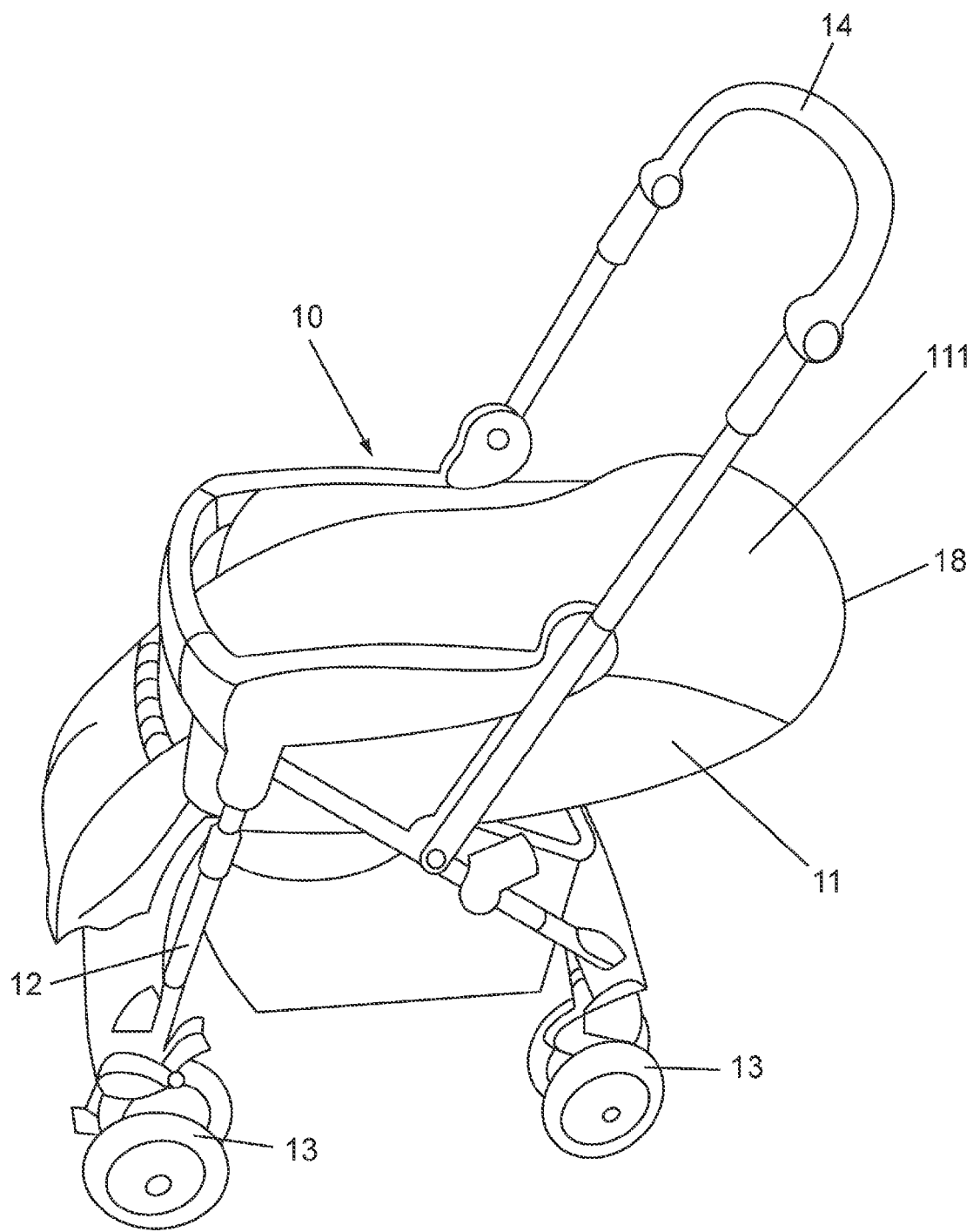
FIG. 3 also is a perspective view, similar to that of FIG. 1, but more to the side and with the stroller seat in a reclined disposition showing, for example, how the top of the core bottom is folded over the top of the stroller seat and cinched about it, fastening the top of the core bottom to the stroller seat.
Figure 4:
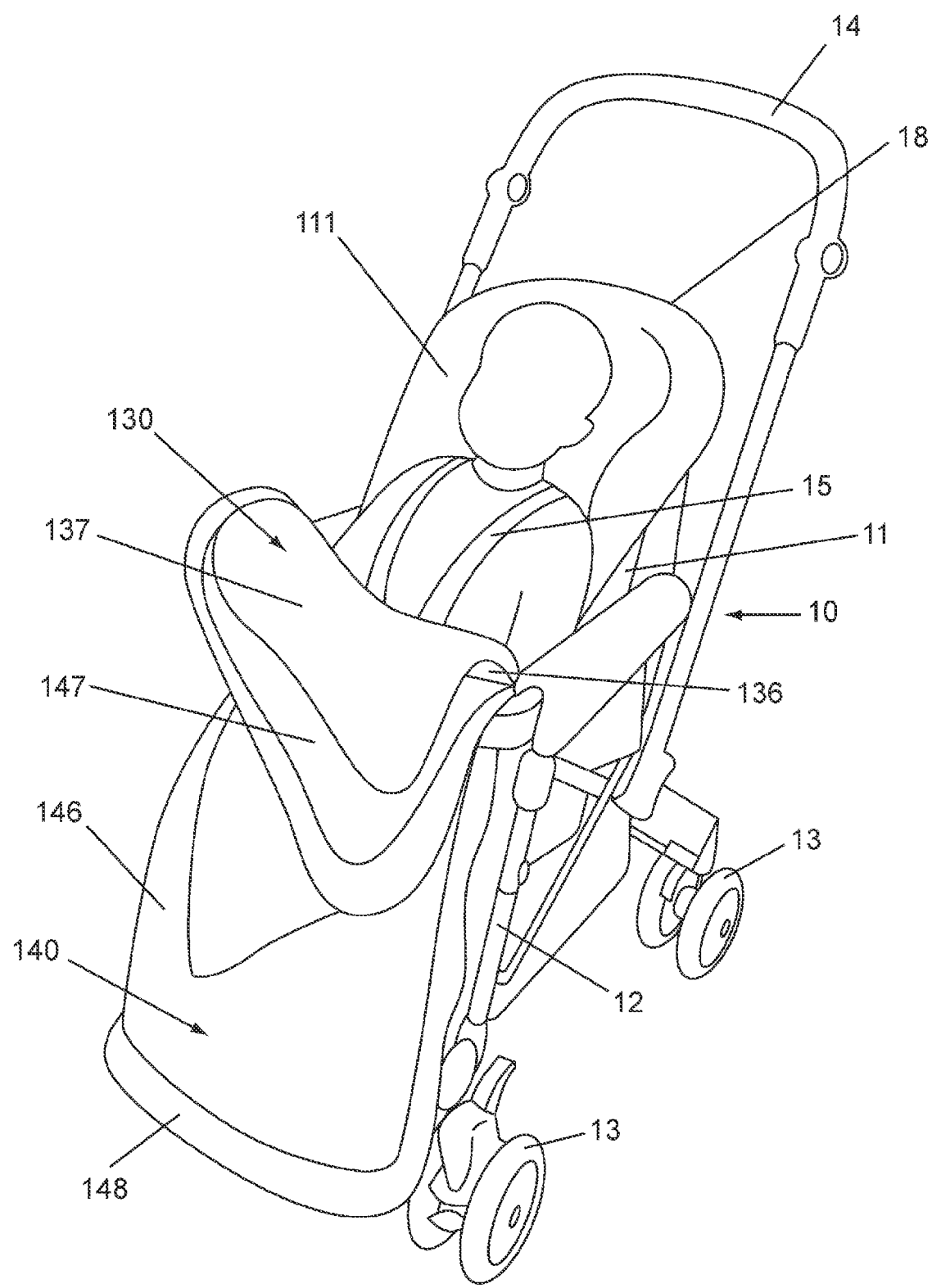
FIG. 4 is still another, front perspective view, similar to that of FIGS. 1 & 2, but with an outer, decorative (or functional) cover element (see FIG. 13) attached to the core top element (see FIGS. 11 & 12), which in turn is connected to the bottom core element shown in FIGS. 1-3 on the stroller, with the cover element and the core top elements having corner portions of them unzipped and turned over, exposing the underside of the cover and the upper and lower sides of the core top.

A boot pouch 120 typically integrally connected to the core bottom 111 at its bottom area has an open-entry, preferably elasticized top 121 (either always with an open entry or, alternatively, with a closeable/openable top using, e.g., a zippered top, not separately illustrated), and sealed sides 122 and a sealed bottom 123, thus being continuously attached to the core bottom material at its side and bottom edges. As can be seen in FIGS. 1 & 2, the boot 120 can be alternatively used to enclose the occupant's feet when flipped to the front side 111, protecting the rest of the bunting material from the occupant's dirty, wet shoes, or flipped back out of the way on the back-side 112 of the core bottom 110. A further, optional use is as a convenient storage pouch for the attached, rolled-up bunting 100 (see FIG. 16).

A piece of heavy-duty, water repellant, easily cleanable material (best seen in FIG. 7) preferably is attached to the front side 111 of the bottom area 113 of the core bottom 110 forming a boot guard or shield area 113A for further protection of the bunting material, particularly for the very absorbent fleece material which normally would be in this area, and for easy cleaning of any dirt, mud or water from the occupant's shoes deposited in this area. The boot guard material preferably uses a tough, abrasion resistant fabric that is particularly well suited to handling soiled boots.

A centralized, rectangular piece of high friction, non-skid material 114A preferably is attached on the back side 112 of the core bottom element 110 located in the central area 114 above the bottom area 113. This non-skid material 114A serves to prevent the bunting 100 from being pulled or being slid out of its desired position on the seat 10/20 when, for example, the occupant is pulled out of the interior formed by the facing, attached, core bottom/top elements 110/130 or the facing, attached, core bottom/cover elements 110/140, as the case may be.

A series of slits 115 (best seen in FIGS. 7 & 8), going completely through the combined, sewn-together, front-side layer 116 and the back-side layer 117 of materials forming the basic body 118 of the core bottom 110, are also coincidentally located in this same central area 114 through which the standard, seat harness straps 15-16/25-26 that come with typical strollers and carriers (e.g., 10/20) can be slid through for strapping the occupant into the seat 11/21. The slits 115 preferably are located at the shoulder, waist and crotch areas of the intended or contemplated occupant to mate with the standard, restraint harness straps 15/25 provided with standard stroller seats and carriers, respectively.

A cinch cord subsystem 119A (best seen in FIGS. 7 & 10), which includes a cinch cord 119B and an associated cord stop/lock toggle 119C, is located along the top periphery of the top area 119 of the core bottom element 110. In attaching the core bottom 110 to the seat 11/21 the top area 119 is draped over the top edge 18/28 of the seat 11/21 and then cinched up. Alternatively, when it is desired to provide a hood for the occupant, the cinch cord subsystem 119A is un-cinched and the folded-over top of the core bottom element 110 is folded back forward and placed about the head of the occupant and re-cinched about the occupant's head, forming an occupant protective hood.

To further secure the core bottom element 110 [and any attached bunting element(s) 130 and/or cover 140] to the stroller 10, special, side connecting straps, for example, having the design of the bunting strap 150 (see FIG. 14), are used to secure each of the sides of the bunting 100 to tubular structural members 12 located adjacent to the sides of the bunting using the side, strap loops 155 (see FIG. 9) on the core bottom 110. To do this, the "suspender"-type clip end 153 is looped around an adjacent, stroller support member 12 and it and the strap material 151 threaded through the D-ring 152, with the "suspender"-type clip 153 then brought inward and clipped to the core bottom element 110 using, for example, a selected one of the belt loops 155.

Using the effective length adjustment buckle 154 in a well known fashion, the separation distance between the adjacent side tubes 12 and the sides of the core bottom 110 can be set to the needed, effective length and tighten up or let out, as necessary, thereby securely attaching the bunting 100 to the stroller structure 12, generally preventing any undesired, diagonal, lateral or longitudinal movement of the bunting on the stroller seat 11. Other strap end fasteners could be used in place of the suspender"-type clip 153 and/or the D-ring 152 but this particular combination has been found to be easily and effectively used in connection with the bunting 100 stroller 10.

Figure 15:
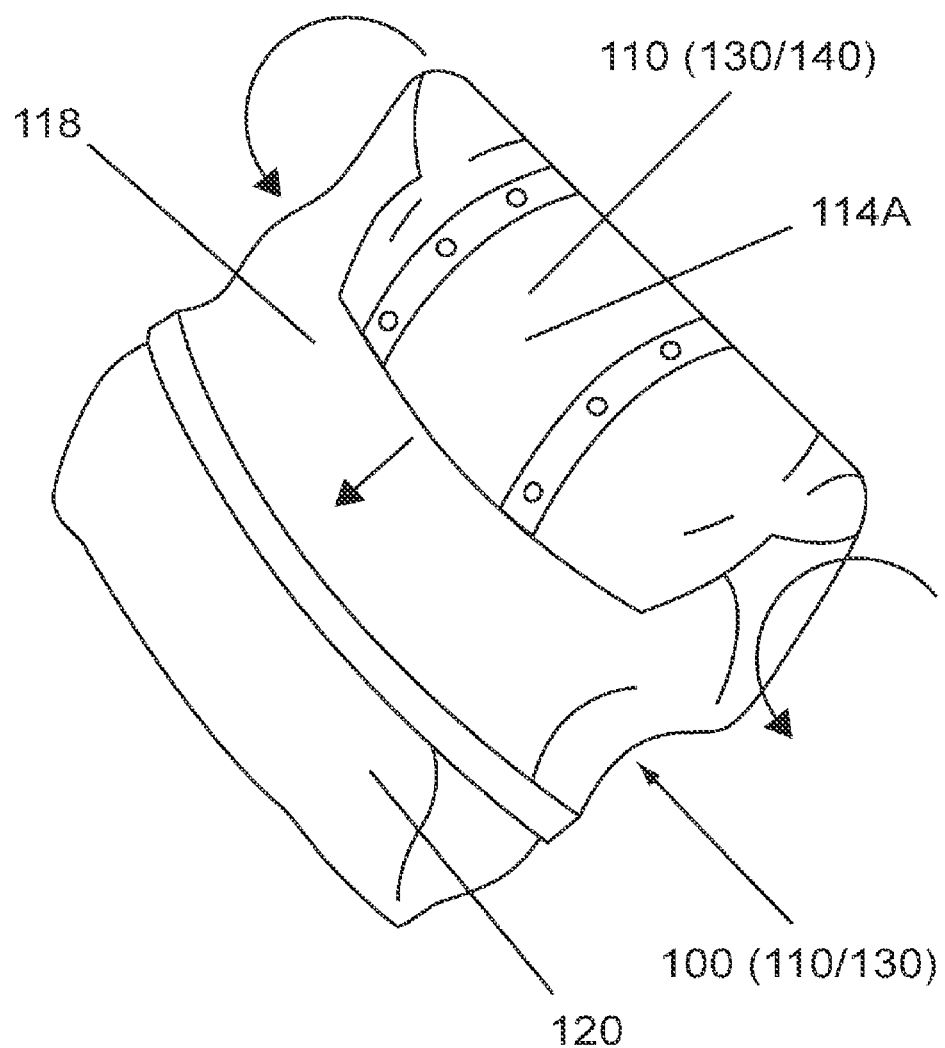
FIG. 15 is a perspective view showing the main body of the bunting being rolled up (partially completed), ultimately to be put into the interior of the boot pouch (see straight arrow), with circular arrow(s) showing the roll-up directions of roll, which, of course, are reversed in unpacking the bunting.
Figure 16:
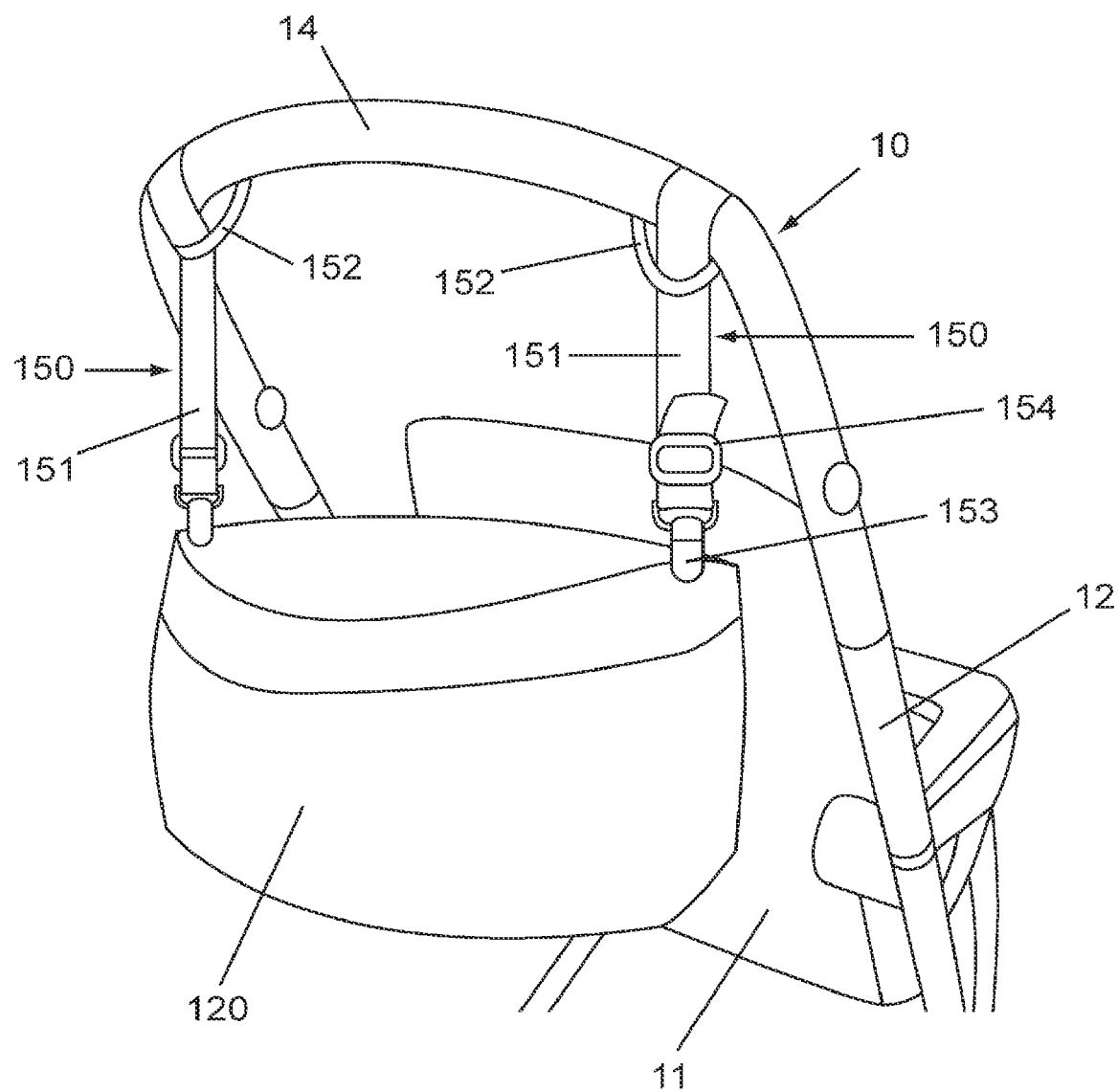
FIG. 16 is a perspective view of the top rear of the stroller with the rolled up bunting layers totally enclosed within the attached boot pouch suspended from the generally tubular, rear handle bar of the stroller using a pair of the bunting straps or suspenders of FIG. 14.

With reference to FIGS. 15 & 16, the "suspender"-type bunting clip & strap 150 can also be used to store the bunting 100 when not in use. As can be seen in FIG. 15, after the bunting 100 has been removed from the stroller/carrier 10/20 its main body 118 is rolled up (note curved, directional arrows) into (note straight directional arrow) the open, elasticized, pouch entry 121 and completely into the interior of the attached boot pouch 120 until it is in the completely enclosed disposition shown in FIG. 16.

If so desired, the rolled up bunting 100 (110/130) can then be suspended for ready access from, for example, the rear handle bar 14 using a pair of bunting straps or suspenders 150, one on either side of the rolled up bunting as seen in FIG. 16, with the D-ring 152 (made, for example, of metal or plastic) used in looping around the structural rear bar 14, in similar fashion to that described above with respect to FIG. 9, and the suspender-type clips 153 used to pinchingly connect the lowest ones of the belt straps 155A, as illustrated, or to the exterior material of the boot pouch 120. Using the lowest ones of the side belt straps 155A located along side of the pouch entry 121 holds the rolled up and covered bunting 100 in a way which prevents it from becoming unrolled while in suspension.

Figure 11:
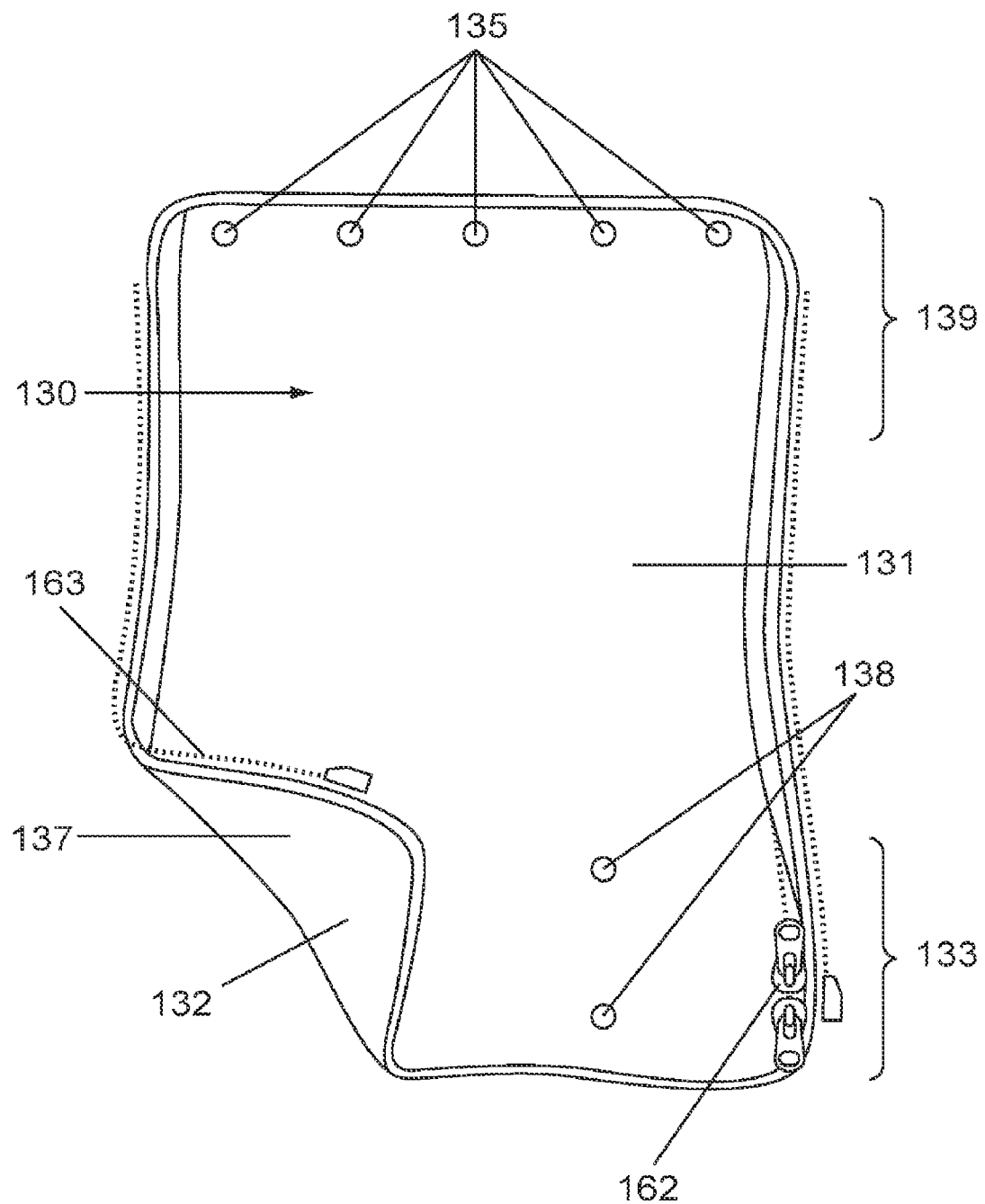
FIG. 11 is a plan view primarily of the top side of the core top element, along with a bottom corner thereof being turned over exposing a small part of the underside side of the core top element, showing the upper one of its two sets of side zipper elements, the lower ones (not generally seen in this figure but seeable better in FIGS. 6 & 12) of which are compatible with the mating zipper elements on the sides of the core bottom, and the upper, exterior ones of which being compatible with mating ones on the under side of the cover element.
Figure 12:
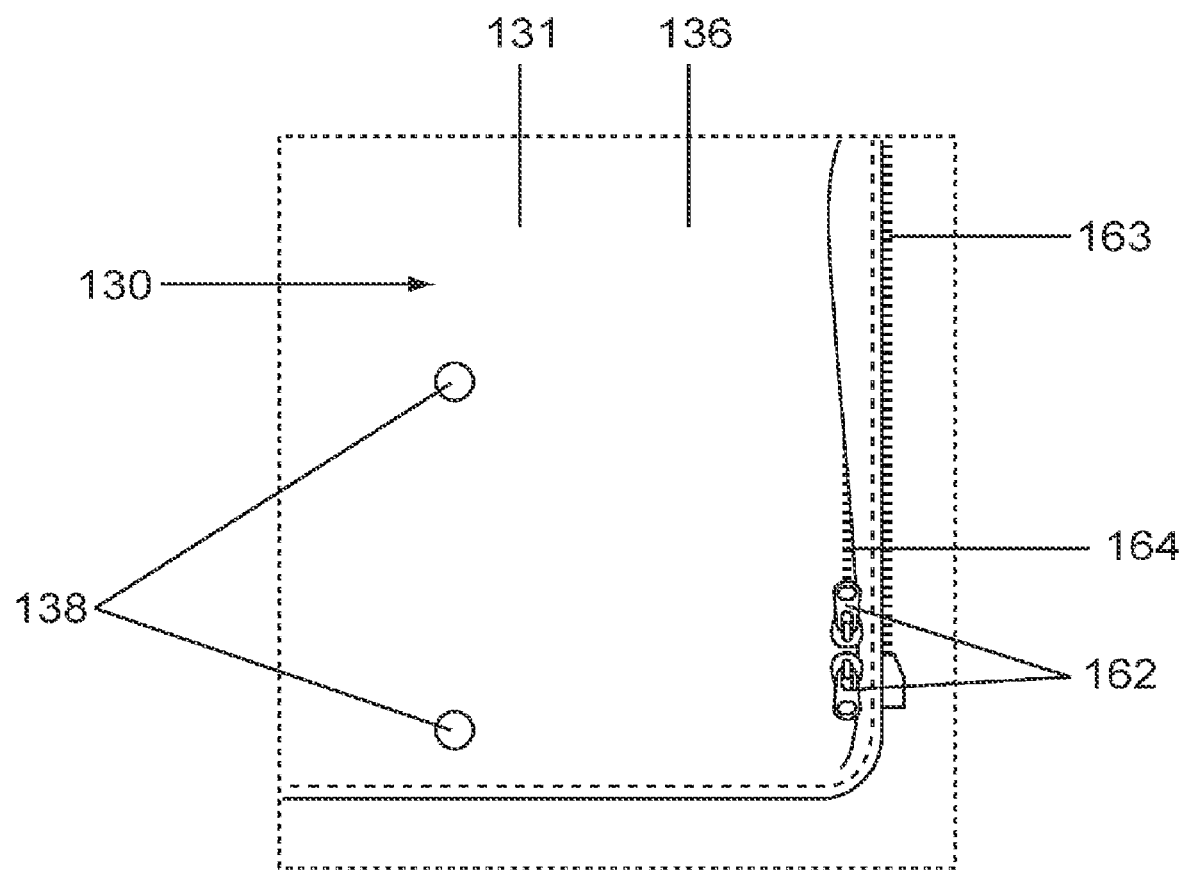
FIG. 12 is a close-up, detail view of the lower, left (from the occupant's perspective) corner, with the lower, right corner being a mirror image thereof, of the core top showing the double set of zipper tracks on the left side of the core top, one above the other, the lower zipper track useable to connect the core top directly to the core bottom and its corresponding, mating, side zipper track, and the upper zipper track with its two-way sliders useable to allow the cover to be directly connected to the core top, covering over the core top and producing three bunting layers, if so desired.

Similar to the core bottom element 110 and with reference particularly to FIGS. 5 & 11, the core top element 130 includes a front, top or upper side 131, an underlying bottom or back or under-side 132, a bottom area 133, a series (e.g., four or five) of top, laterally spaced, fastening buttons 135, a top-side material layer 136, an under-side material layer 137 and a top area 139. Likewise, with reference particularly to FIGS. 4 & 13, the cover 140 includes a front/exterior or upper side 141, a back, under-side 142, a bottom area 143, a series (e.g., four or five) of top, fastening button holes 145, a top-side material layer 146, an under-side material layer 147, peripheral fringe 148 and a top area 149. If the cover 140 is directly attached to the top side 131 of the core top 130, the series of mating fasteners 135/145 (e.g., buttons & button holes) are used to connect the top areas 139/149 together, so that, for example, their top areas 139/149 of both can be commonly folded down together and thereafter folded back up again.

As can be seen, for example, in FIG. 6, all three bunting elements or layers 110, 130 & 140, namely the core bottom layer 110, the core top layer 130 & the cover layer 140, have along their sides one or more fastener elements 160, e.g. zipper elements. For example, a main, separating type, zipper run 161 extends along each of the opposed, sides edges of the core bottom 110 from about its bottom edge continuously up to around or about the top of the central area 114. Each of these zipper runs 161 includes at least one zipper box, preferably at the bottom end of the run, and a zipper stop at its upper end and each preferably has two or double, pull tabs 162 on each run.

As can be seen in FIG. 11, there are a set of, for example, four, symmetrically positioned snaps 138 (two of which can be seen with the other two being covered over under the folded-over corner). The ends of the snaps 138 on the upper side 131 are smooth, having neither male nor female snap ends. However, the undersides of the snaps 138 are, for example, female snaps (unseen) located on the under-side 132 These are designed to mate with the like positioned snaps on the exterior layer of the flipped-up boot pouch 120 (flipped-up as in disposition of FIG. 1), allowing that exterior to mate with and fasten to the inner-side of the core top 130.

Thus, when a child is placed in between the core bottom 110 and the core top 130, his/her feet will more easily go into the opened boot pouch now fixedly held between the lower ends of the core bottom via the exterior layer's attachment to the core bottom and the snaps on the core top.

The underside 132 of the core top 130 (see FIG. 12) includes along each one of its side edges a mating, main, complimentary zipper run 163 with a zipper pin at its lower end and a zipper stop at its upper end, with the run 163 having complimentary teeth to those of the zipper run 161. When it is desired to attach the core top 130 to the core bottom 110, the pin on the zipper run 163 is inserted into the zipper box and the pull tabs 162 at the bottom of the zipper run 161, allowing the opposed side edges of the core elements 110/130 to be zipped directly together via the zipper runs 161/163 by pulling up the upper pull tab 162.

The upper side 131 of the side edges (again see FIG. 12) of the core top 130 each has a supplemental, main zipper run 164 with box/stop ends (identical to the zipper run 161) which mates with a supplemental, complimentary zipper run 165 with zipper pin/stop ends (identical to the zipper run 163) on the underside of the cover 140. This arrangement allows the zipper run 165 on the cover 140 to be either attached to the upper side of the core top 130 (and indirectly to the core bottom 110) using mating zipper run 164 or be attached directly to the core bottom 110 using the mating zipper run 161, as may be desired.

Exemplary dimensions for the core bottom 110 are about fifteen (15") inches wide at its bottom, about twenty-five and a quarter (25.25") inches wide at its occupant hip area and about twenty-one and a half (21.5") inches wide at its top (these varying widths can be best seen in FIGS. 7 & 8) by about forty-two and a half (42.5") inches long; and for the core top 130 (and cover 140) about twenty-one and a half (21.5") inches wide by about twenty-eight and a quarter (28.25") inches long. Such dimensions work well with either, for example, a typical, young child stroller such as the stroller 10 or the combined baby carrier/car-seat 20, supplying the bunting 100 with great versatility and applicability. Exemplary dimensions for the boot guard or shield material 113A in the bottom area 113 on the top side 111 of the core bottom 110 are about fifteen (15") inches wide (same as the width of the bottom area 113 of the core bottom 110) by about six and a half (6.5") inches high; while exemplary dimensions for the boot pouch 120 are about four and a half (4.5") inches deep by about six and a half (6.5") inches high.

Exemplary materials for the core bottom 110 include
a front-side layer 116 of fleece and a material that is resistant to abrasions, tears and scuffs, such as, for example, "Cordura®" brand material (DuPont),
a heavy-duty, easily cleanable, water resistant material, for the boot guard area 113 using a tough, abrasion resistant fabric that is particularly well suited to handling, for example, soiled boots, and
a back-side layer 117 preferably of a material which provides the soft, supple touch of cotton with the strength, durability and performance advantages of nylon, namely, e.g., "Supplex®" material (DuPont), which is also as strong as it is soft, resisting abrasions, punctures and tears and is also breathable and odor-, wind- and water-resistant, a cottony-soft, supple nylon fabric material that is described by the DuPont® company as becoming a classic in performance outerwear and casual wear, swim wear, active wear, etc. for its underside 112,
with a section 114A of preferably a durable, anti-slip, high friction, abrasion-resistant, non-scuff grip material which retains its grip, wet or dry, such as, for example, "TOUGHTEK 9000" which is a material having a PVC "rubberized" coating applied to a knit backing in the back-side's central area 114.

For the core top 130 exemplary materials include an underside layer 137 of fleece and an exterior, upperside layer 136 of "Supplex®" material.

For the cover 140 exemplary materials include an underside, soft layer 147 of e.g., fleece, flannel, or other appropriate material, etc., and an exterior, upperside layer 146 of, for example, decorative fabric material of, for example, blue, patterned silk with, for example, a periphery of decorative fringe material 148; respectively.

If the cover 140 is designed as an alternative functional cover, the materials used will be reflective of the function (warmth, rain-"proofing" etc.) it is designed to provide. If so desired, a complement or kit of multiple covers 140 can be provided to the user, each one carrying a different decorative, aesthetic design, logo, slogan, etc., with the user selecting a desired cover for either a desired decorative theme for that time period, and/or alternatively displaying, for example, a team logo or slogan, etc. Also, if so desired, functional and/or decorative layers can be individually provided and selectively combined together for other optional choices.

Of course, these exemplary, currently preferred dimensions and materials are subject to many changes with much variation.

In view of all of the foregoing, it should be understood that some of the advantages of the preferred, exemplary embodiment of the bunting 100 are:

1. One Size Fits All—

The bunting 100 can be used for children from newborn to about four (4) years old, thereby eliminating the need to purchase, for example, two separate buntings, one in the newborn or baby stage and a later one for the young, small child up to about four (4) years of age.

The bunting 100 fits in infant carriers/car seats (note FIG. 5), toddler car seats, and strollers (note FIGS. 1-4), etc.

The bunting 100 fits in most if not all brands of the above transports (versus buntings that are designed to fit only a particular brand of stroller).

2. Use of a Boot Pouch 120—

The bottom portion of the core bunting 100 (preferably from about the occupant's knees to about the heels) may remain open, i.e., the bottom edges unfastened or be enclosed by use of an attached boot pouch 120 that folds behind the bunting when not in use.

The entire bunting 100 can be rolled into the boot pouch 120 (note FIGS. 15 & 16) for easy storage and packing.

3. Preferably the ability to add decorative covers 140 to the bunting 100—

On the core top 130 there preferably exists a further, preferably hidden, zipper run 164 to which selected decorative and/or functional covers 140 may be optionally attached.

Decorative covers 140 (which may be sold separately) allow the user to change the look of the bunting 100 without having to purchase, for example, an entirely new multi-layer bunting.

Decorative covers 140 preferably also may be used alone. They easily can, for example, be designed to be zipped (or otherwise connected) directly to the core bottom 110 of the bunting 100 without requiring the use of the core top 130, if so desired.

Additional Features—

The bottom area 113 of the upper side 111 of the core bottom 110 preferably is at least partially covered with a heavy weight, water impervious material 113A (e.g., "Cordura®") that is easily wipe-cleanable and can withstand on an on-going basis the potentially damaging impact of and contact with an occupant's wet and dirty boots or shoes.

The bunting 100 preferably has two-way, vertical zipper slides or pull tabs 162 on the main/supplemental zipper runs 161/164 that allow the top portion(s) of the core top 130 and/or the cover 140 to fold over onto the child's lap (FIG. 4) and/or for the child's feet to be unbound. These dual-direction, two-way zippers, well known in the zipper art, also facilitate the placing and removing of the child into the stroller 10 by allowing at least part of the connection between the core bottom 110 and the core top 130 to be easily unzipped, allowing at least part of the core top 130 to be moved out of the way.

The materials used in the bunting 100 preferably are warm, yet thin enough to allow most strollers to be folded with the bunting still inside it.

The bunting 100 preferably has a nonslip surface on its back-side to prevent it from sliding in the seat.

A number of separate, side fastening, bunting straps or suspenders 150 preferably are included with the bunting 100 to allow the user to also attach the sides of the bunting's core bottom 110 (using, for example, side loops 155) to the typically tubular structural members 12 of the stroller 10 located adjacent to the sides of the seat 11. These same straps 150 may be used with the rectangular core top 130 or the rectangular, decorative/functional cover 140 alone, to loosely connect its sides to the tubular members, thus allowing the core top or cover to be used as, for example, simple lap blankets without using the core bottom 110 at all.

The top core portion 130 and/or cover 140 of the bunting 100 preferably may be separately used as a blanket.

Figure 17:
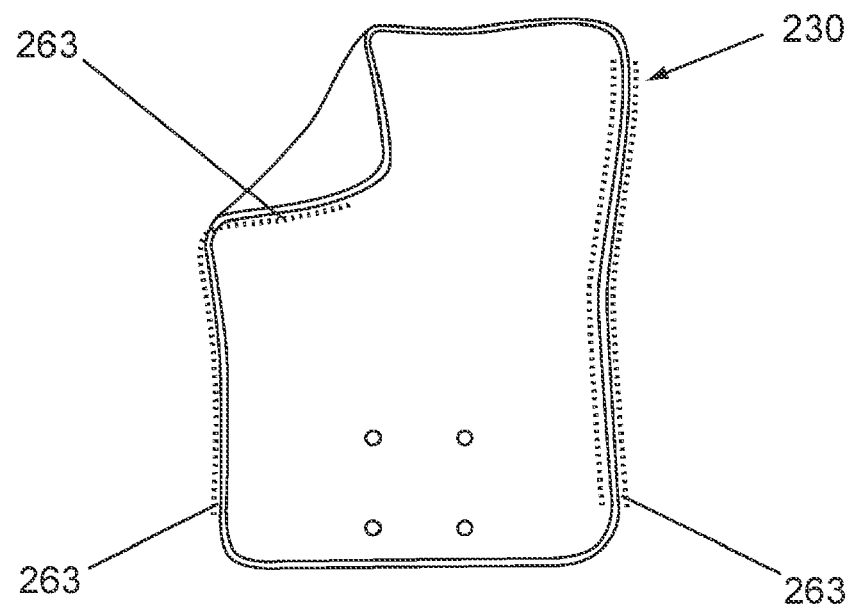
FIG. 17 is a plan view of the top side of another, alternate, exemplary embodiment of the core top element, currently preferred, with a top corner thereof being turned over exposing a part of the under-side of the core top element, showing its side zipper elements which are compatible with the mating zipper elements on the sides of the core bottom for connecting the two directly together.
Figure 18:
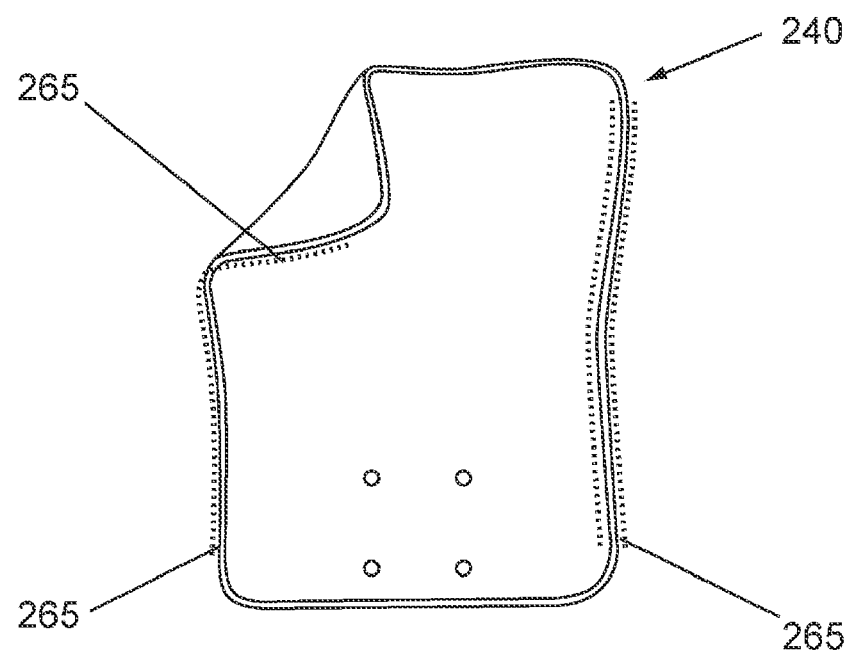
FIG. 18 is a plan view of the top side of another, alternate, exemplary embodiment of the cover, currently preferred, with a top corner thereof being turned over exposing a part of the under-side of the cover element, showing its side zipper elements which likewise are compatible with the mating zipper elements on the sides of the core bottom for connecting the two directly together.

Alternate, Exemplary Embodiment (FIGS. 17 & 18)

In further work on proto-type embodiments of the invention, some changes were made to the foregoing described embodiment. In particular, in the most current exemplary embodiment, the core top 230 and cover 240 are very similar to the core top 130 and cover 140, respectively, except that the cover 240 is designed to only be attachable directly to the core bottom 110.

In the original design above, the cover 140 could either— be attached directly to the core top 130, which was itself attached to the core bottom 110, or directly be attached to the core bottom 110 (note FIG. 6 and its alternative, dashed double-ended arrows). However, in the most current exemplary embodiment of the bunting, the cover 240 (see FIG. 18) is only attachable directly to the core bottom 110.

As can be seen in FIGS. 17 & 18, the current core top 230, in comparison to the original core top 130, preferably has no buttons (cf. 135), no secondary zippers (cf. 164), and no associated covering flap for the secondary zippers, while the current cover 240, in comparison to the original cover 140, preferably has no buttonholes (cf. 145) and no fringe/border (cf. 148).

The current cover 240 is attachable only directly to the core bottom 110 by means of mating peripheral zipper runs 265 (comparable to 165) & 161, respectively, in the initial embodiment. Alternatively, the core top 230 is attached to the core bottom 110 in the same fashion as that in the initial embodiment using mating peripheral zipper runs 263 (comparable to 163) and 161, respectively.

This current approach makes the manufacturing of the bunting easier but at the loss of some flexibility of use achieved in the initial or original embodiment 100.

It should be understood that the exemplary dimensions and particular materials and configurations of the various bunting parts stated above are subject to great variation.

It likewise should be understood that the term "child" when used in the claims hereof is intended to be used broadly, including covering a baby.

It also is noted that the embodiment described herein in detail for exemplary purposes is of course subject to many different variations in structure, size, design, application and methodology. Because many varying and different, additional embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense unless called for in one or more of the following claims.

What is claimed is:

1. A child bunting system for a child carrier comprising:

a bottom core element of flexible material having a top area and a bottom area and placeable in or on the child carrier, the bottom core element being at least about co-existent in size with a child carrying portion of the child carrier;

a separable, top core element of flexible material attachable to and removable from the bottom core element by one or more fastening devices, the top core element having a top portion locatable below the top area of the bottom core element, and a bottom portion locatable in overlying juxtaposition to the bottom area of the bottom core element when the two elements are fastened together, a space formed between the bottom core element and the top core element, the space shaped and sized to receive a child with a head of the child on the top area of the bottom core element and two feet of the child extending down past the bottom portion of the top core element, wherein the bottom area of the bottom core element and the bottom portion of the top core element are openable with respect to one another when the top core element and the bottom core element are attached together; and a cover of flexible material attachable by easily fastenable and un-fastenable fastening devices to at least one of the core elements, the cover being about coextensive in size with the top core element.

2. The bunting system of claim 1, wherein the bottom core element has a bottom terminal end, and wherein:

the bottom core element includes a boot pouch in its bottom area at the bottom terminal end into which the child's feet are placeable while the child is positioned on the bottom core element.

3. The bunting system of claim 2, wherein the bottom core element has a top side and an underside which interfaces with the child carrying portion of the child carrier, and wherein:

the boot pouch is flippable back and forth between being located on the underside when not in use and on the top side to be useable by the child for optionally inserting the two feet of the child with the boot pouch fully enclosing a bottom interior of the bunting system.

4. The bunting system of claim 2, wherein:
the bottom core element can be rolled up and inserted into the interior of the boot pouch for storage between uses of the bottom core element.

5. The bunting system of claim 1 further comprising a boot guard area positioned on a surface of the bunting system adjacent to the child's feet while the child is placed on top of the bottom core element, the boot guard area formed of an abrasion resistant fabric.

6. The bunting system of claim 1, wherein the child carrying portion of the child carrier has sides and the child carrier is a stroller made in part of tubular members located in part along the sides of the child carrying portion, and wherein the core elements each has sides made of flexible material, and wherein there is included:
a series of at least two elongated, suspender-type fastening straps having two ends, each having a fastening element at at least one end, the suspender-type straps being useable to connect the sides of at least one of the core elements to the tubular members.

7. The bunting system of claim 1, wherein:
the top core element has two, independent sets of fastening devices, one set being compatible with mating fastening devices on the bottom core element and the other being compatible with mating fastening devices on the cover, while the cover's fastening devices are also compatible with the fastening devices on the bottom core element, allowing the cover to be attached when desired to either the top core element which is attached to the bottom core element or, alternatively, directly to the bottom core element.

8. The bunting system of claim 1, wherein:
the top core element has only one set of fastening devices, the set being compatible with one or more mating fastening devices on the bottom core element; and wherein the cover includes a second set of fastening devices compatible with the one or more mating fastening devices on the bottom core element; whereby either the top core element or the cover can be attached to the bottom core element.

9. The bunting system of claim 1, wherein the bottom core element has a curved, upper peripheral edge, and wherein: the top area of the bottom core element includes a cinch member along the curved, upper peripheral edge, allowing the top area to be cinched up around the head of the child, forming a hood for the child.

10. The bunting system of claim 1, wherein:
the bottom core element and the top core element each has two, opposed sides, the one or more fastening devices includes two zippers located and extending along the respective sides of the top core element and the bottom core element, a first half of each of the two zippers on the sides of the top core element extending up into the top portion, and a second half of the two zippers on the sides of the bottom core element extending short of the top area, with neither of the two zippers extending laterally across either the bottom area or the bottom portion, leaving the lowest extent of the bottom portion and the bottom area unconnected, allowing the child's feet to extend past the bottom portion and the bottom area.

11. The bunting system of claim 1, wherein:
the bottom core element and the top core element each has two, opposed sides, the one or more fastening devices including mating zippers located and extending along the respective sides of the elements, with the mating zippers on the sides of the top core element extending up into the top portion, while the mating zippers on the sides of the bottom core element extending short of the top area, and
the cover including opposed sides and zippers located and extending along its sides for mating with at least one of the core elements.

12. The bunting system of claim 1, wherein the bottom core element is contoured and has a curved, upper peripheral edge allowing the top area to be folded over the top of the carrier; and wherein:
the top area of the bottom core element includes a cinch member along the curved, upper peripheral edge, with the cinch member being cinchable up around the top of the child carrier, attaching the bottom core element to the top of the child carrier.

13. The bunting system of claim 1, further comprising a plurality of top core elements which are of comparable size and serve as optional alternatives to one another for selective attachment to at least one of the top core element and the bottom core element.

14. The bunting system of claim 6, wherein at least one of the fastening elements is a clip which clips to at least one of the core elements.

15. A child bunting system for a child carrier comprising:
a bunting for a child including a flexible material forming a first interior of a size suitable for holding a body of the child for covering and enclosing the body, the bunting having a top area and a bottom area placeable in and on the carrier with the body ultimately being placeable in the first interior for being covered, with a lower surface at least about co-existent in size with a child carrying portion of the child carrier, and the bunting including an attached boot pouch in the bottom area having a second interior of a size suitable for holding two feet of the child into which the two feet are placeable when the child is positioned in the first interior and the bunting is positioned in the child carrier with a head of the child resting in the top area, the boot pouch extending laterally at least partially across the bunting, and the boot pouch being moveable from an underside of the bunting to an upper side of the bunting, the underside of the bunting being at least partially in contact with the child carrier when the bunting is positioned on the child carrier for use in enclosing the body, the first interior being open at the bottom area, allowing the two feet to extend into the boot pouch.

16. The bunting system of claim 15, wherein:
the boot pouch is flippable back and forth between being located on the underside when not in use for the child's feet and being located on the upper side for optionally inserting and covering the child's feet with the boot pouch closing off the bottom area of the bunting, the boot pouch having a top edge with an elasticized opening at the top edge, the elasticized opening extending from side to side of the boot pouch.

17. The bunting system of claim 15 further comprising one or more elongated, suspender-type fastening straps having two ends, each having a fastening element at at least one end, the suspender-type straps adapted to connect a portion of the bunting to a tubular member of a child stroller.

18. The bunting system of claim 15 further comprising a boot guard area positioned on a surface of the bunting system adjacent to the child's feet while the child is positioned within the first interior, the boot guard area formed of an abrasion resistant fabric.

19. The bunting system of claim 18 wherein the abrasion resistant fabric is water resistant.

* * * * *